United States Patent
Chen et al.

(10) Patent No.: US 11,523,418 B2
(45) Date of Patent: Dec. 6, 2022

(54) METHOD AND APPARATUS FOR RESOURCE INDICATION

(71) Applicant: ZTE CORPORATION, Guangdong (CN)

(72) Inventors: Mengzhu Chen, Guangdong (CN); Hao Wu, Guangdong (CN); Jun Xu, Guangdong (CN); Zhaohua Lu, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 3 days.

(21) Appl. No.: 17/087,250

(22) Filed: Nov. 2, 2020

(65) Prior Publication Data
US 2021/0120572 A1  Apr. 22, 2021

Related U.S. Application Data

(63) Continuation of application No. PCT/CN2018/095648, filed on Jul. 13, 2018.

(51) Int. Cl.
*H04W 72/12* (2009.01)
*H04B 7/06* (2006.01)
*H04L 5/00* (2006.01)
*H04L 25/02* (2006.01)
*H04W 56/00* (2009.01)
*H04W 72/04* (2009.01)
*H04W 80/02* (2009.01)

(52) U.S. Cl.
CPC ...... *H04W 72/1273* (2013.01); *H04B 7/0626* (2013.01); *H04L 5/0051* (2013.01); *H04L 25/0226* (2013.01); *H04W 56/0045* (2013.01); *H04W 72/042* (2013.01); *H04W 72/0446* (2013.01); *H04W 72/0493* (2013.01); *H04W 80/02* (2013.01)

(58) Field of Classification Search
CPC ... H04L 5/0051; H04L 5/0053; H04L 5/0094; H04L 25/0226; H04W 56/0045; H04W 56/005; H04W 72/042; H04W 72/0446; H04W 72/0493; H04W 72/1257; H04W 72/1289
See application file for complete search history.

(56) References Cited

U.S. PATENT DOCUMENTS

| 2013/0315159 | A1 | 11/2013 | Xia et al. | |
| 2019/0261405 | A1* | 8/2019 | Ang | H04W 72/0446 |
| 2020/0221429 | A1* | 7/2020 | Li | H04W 72/042 |
| 2021/0058999 | A1* | 2/2021 | Chen | H04W 72/042 |
| 2021/0067276 | A1* | 3/2021 | Wang | H04L 5/0055 |
| 2021/0092751 | A1* | 3/2021 | Jiang | H04W 72/1289 |

FOREIGN PATENT DOCUMENTS

| CN | 106162897 A | 11/2016 |
| CN | 107919948 A | 4/2018 |
| WO | 2017110960 A1 | 6/2017 |

* cited by examiner

*Primary Examiner* — Pao Sinkantarakorn
(74) *Attorney, Agent, or Firm* — Duane Morris LLP

(57) ABSTRACT

A method and apparatus for indication of resource ports in a communication system is disclosed. In one embodiment, a method performed by a wireless communication node, includes: transmitting a first message to a wireless communication device, and after a time offset, performing wireless communications scheduled by the first message with the wireless communication device.

26 Claims, 8 Drawing Sheets

METHOD AND APPARATUS FOR RESOURCE INDICATION

TECHNICAL FIELD

This disclosure relates generally to wireless communications and, more particularly, to a method and apparatus for indication of resources in a communication system.

BACKGROUND

Multiple input multiple output (MIMO) technology have been applied to wireless communication system to improve reliability and capacity of data transmission. In the MIMO technology, scheduled antenna ports for user equipment (UE) indicated by demodulation reference signal (DMRS) ports in downlink control information (DCI) received from a base station (BS) are used for receiving physical downlink shared channel (PDSCH) and/or transmitting physical uplink shared channel (PUSCH). Information of the scheduled antenna ports can be only determined when the DCI is decoded correctly by the UE. Herein a resource, specifically antenna indication scheme is introduced to reduce the power assumption of the UE without scheduling flexibility impairment.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with some embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

Multiple input multiple output (MIMO) is a method for improving reliability and capacity of a wireless communication system for data transmission. The antenna ports scheduled for the user equipment (UE) for receiving Physical downlink shared channel (PDSCH) and/or transmitting Physical uplink shared channel (PUSCH) can be indicated by downlink control information (DCI) received from a base station (BS). Information of the scheduled antenna ports can be only determined when the DCI is decoded correctly by the UE. The scheduling flexibility and power consumption are important factors to the wireless communication system. Therefore, there exists a need for a method and apparatus for resource indication to reduce the power consumption while maintaining or even improving the scheduling flexibility of the wireless communication system.

In one embodiment, a method performed by a wireless communication node, includes: transmitting a first message to a wireless communication device, and after a time offset, performing wireless communications scheduled by the first message with the wireless communication device.

Yet, in another embodiment, a method performed by a wireless communication device, includes: receiving a first message from a wireless communication node; and after a time offset, performing wireless communications scheduled by the first message with the wireless communication node.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

DETAILED DESCRIPTION OF EXEMPLARY EMBODIMENTS

Figure 1A:
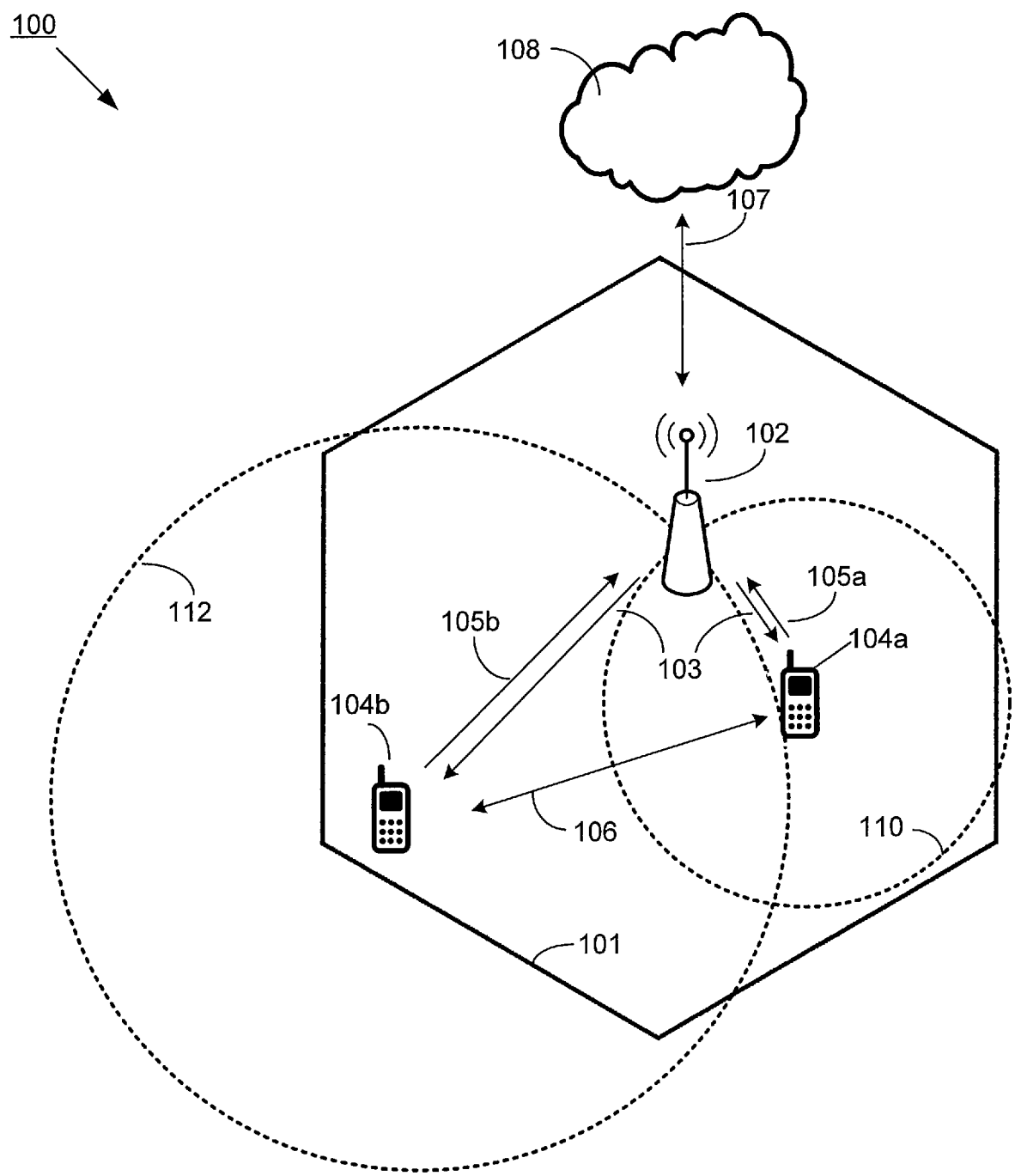
FIG. 1A illustrates an exemplary wireless communication network illustrating achievable modulation as a function of distance from a BS, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100, in accordance with some embodiments of the present disclosure. In a wireless communication system, a network side communication node or a base station (BS) can be a node B, an E-utran Node B (also known as Evolved Node B, eNodeB or eNB), a gNodeB in a new radio (NR) access technology, a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" hereinafter in all the embodiments in this disclosure. Such communication nodes may be capable of wireless and/or wired communications, in accordance with some embodiments of the invention. It is noted that all the embodiments are merely preferred examples, and are not intended to limit the present disclosure. Accordingly, it is understood that the system may include any desired combination of UE's and BSs, while remaining within the scope of the present disclosure.

Referring to FIG. 1A, the wireless communication network 100 includes a BS 102 and a UE 104a, and a UE 104b (collectively referred to as UE's 104 herein). The BS 102 and the UE's 104 are contained within a geographic boundary of cell 101. A wireless transmission from the UE 104 to the BS 102 is known as an uplink transmission, and a wireless transmission from the BS 102 to the UE 104 is known as a downlink transmission.

In some embodiments, the UE 104a has a direct communication channel with the BS 102 operating at a first frequency resource f1 for downlink communication 103 and a second frequency resource f2 for uplink communication 105a. Similarly, the UE 104b also has a direct communication channel with the BS 102 operating at the first frequency resource f1 (e.g., carrier or bandwidth part) for downlink communication 103 and a third frequency resource f3 for uplink communication. In some embodiments, the second frequency resource f2 and the third frequency resource 3 are different from the first frequency resource f1. In some embodiments, the second frequency resource f2 and the third frequency resource f3 are different from each other. Therefore, the second frequency resource f2 and the third frequency resource f3 have different transmission characteristics, such as for example path loss, coverage, maximum transmission power, etc. In some embodiments, the bandwidth of the first frequency resource f1, the second frequency resource f2 and the third frequency resource f3 can be also different. In some embodiments, the second frequency resource f2 and the third frequency resource f3 may have different transmission characteristics on different bandwidth parts, such as for example path loss, coverage, maximum transmission power, etc.

In some embodiments, the UE 104a has a direct communication channel with the BS 102 operating at a first time resource t1 for downlink communication 103 and a second time resource t2 for uplink communication 105a. Similarly, the UE 104b also has a direct communication channel with the BS 102 operating at the first time resource t1 for downlink communication 103 and a third time resource t3 for uplink communication 105b. In some embodiments, the second time resource t2 and the third time resource t3 are different from the first time resource t1. In some embodiments, the second time resource t2 and the third time resource t3 are different from each other. Therefore, the second and third time resources t2/t3 a have different transmission characteristics, such as for example path loss, coverage, maximum transmission power, etc. In some embodiments, the first, second and third time resources t1/t2/t3 can be also different. In some embodiments, the second and third time resources t2/t3 may have different transmission characteristics, such as for example path loss, coverage, maximum transmission power, etc.

Although only 2 UE's 104 are shown in FIG. 1A, it should be noted that any number of UE's 104 can be included in the cell 101 and are within the scope of this invention. In some embodiments, the coverage of uplink communication 105b is larger than that of the uplink communication 105a, as indicated by dotted circles 112 and 110, respectively. The BS 102 is located at the intercept region of the coverage areas 110 and 112 in order for the BS 102 to perform uplink communication with the UE 104a and UE 104b in the cell 101.

When the UE 104b is at the extreme cell edge 101, e.g., with a longer distance between the BS 102 and UE 104b, path loss becomes significant, so the UE 104b will transmit at a maximum power over a long distance at the third frequency resource f3 or the third time resource t3. As a result, the data rate is relatively low between BS 102 and UE 104b in this case. As the UE 104 moves closer to the BS 102 (i.e., UE 104a), the path loss decreases and the signal level at the BS 102 increases, thus the SNR improves. In response, the BS 102 instructs the UE 104 to reduce power on the second frequency resource f2 or the second time resource t2 to minimize interference to other UE's and/or the BS 102.

The direct communication channels 105/103 between the UE's 104 and the BS 102 can be through interfaces such as an Uu interface, which is also known as UMTS (Universal Mobile Telecommunication System (UMTS) air interface. The direct communication channels (sidelink transmission) 106 between the UE's can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

The UE's 104a and 104b obtains its synchronization timing from the BS 102, which obtains its own synchronization timing from the core network 108 through an internet time service, such as a public time NTP (Network Time Protocol) server or a RNC (Radio Frequency Simulation System Network Controller) server. This is known as network-based synchronization. Alternatively, the BS 102 can also obtain synchronization timing from a Global Navigation Satellite System (GNSS) (not shown) through a satellite signal 106, especially for a large BS in a large cell which has a direct line of sight to the sky, which is known as satellite-based synchronization.

Figure 1B:
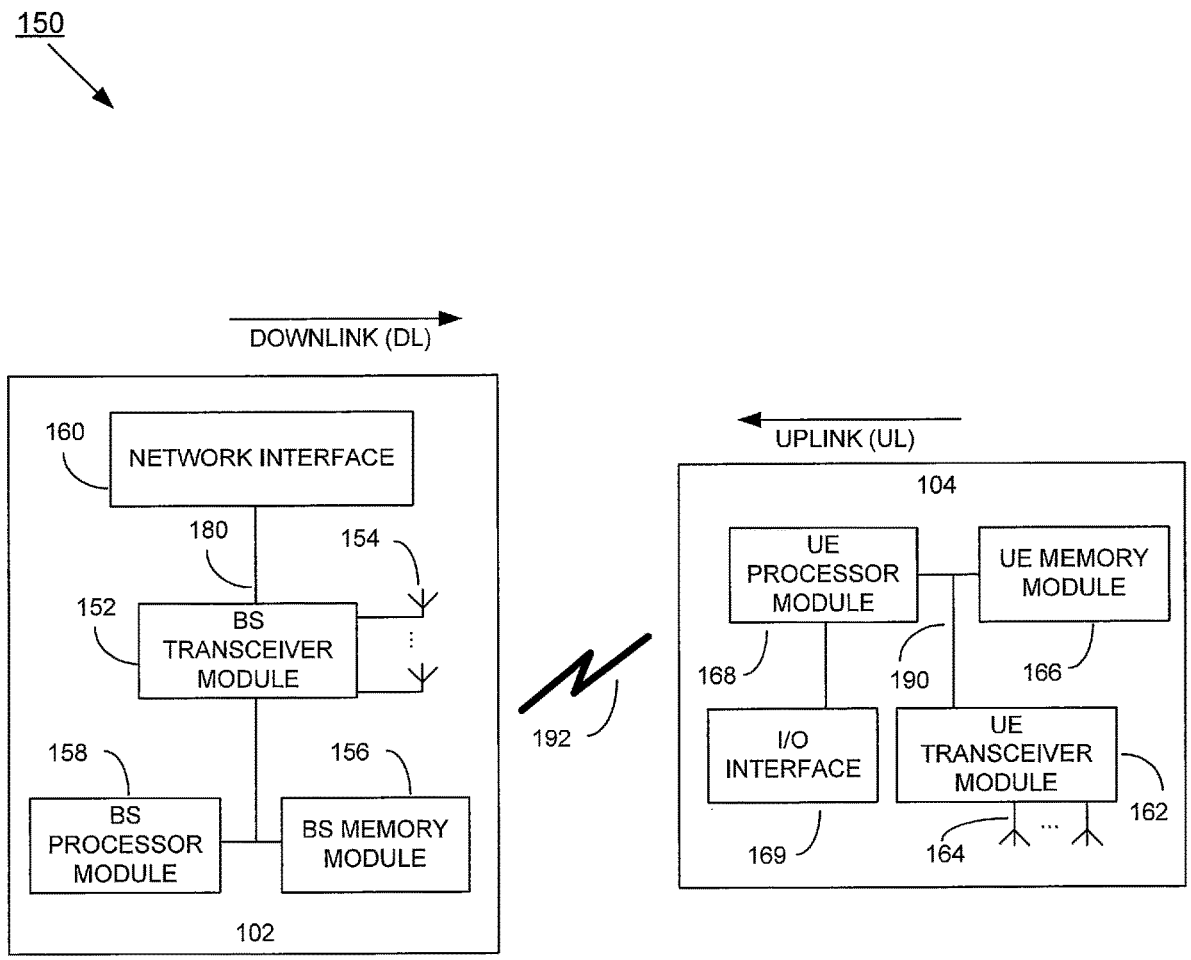
FIG. 1B illustrates a block diagram of an exemplary wireless communication system for a slot structure information indication, in accordance with some embodiments of the present disclosure.

FIG. 1B illustrates a block diagram of an exemplary wireless communication system 150, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and two UEs 104a and 104b, collectively referred to as UE 104 below for ease of discussion. The BS 102 includes a BS transceiver module 152, a BS antenna array 154, a BS memory module 156, a BS processor module 158, and a Network interface 160, each module being coupled and interconnected with one another as necessary via a data communication bus 180. The UE 104 includes a UE transceiver module 162, a UE antenna 164, a UE memory module 166, a UE processor module 168, and an input/output (I/O) interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of blocks, modules, circuits, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

A wireless transmission from the UE 104 to the BS 102 is known as an uplink transmission, and a wireless transmission from the BS 102 to the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192 or with other UEs via the wireless communication channel 193. The wireless communication channel 193 can be any wireless channel or other medium known in the art suitable for sidelink transmission of data as described herein.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to transmit the physical downlink control channel (PDCCH) and configured slot structure related information (SFI) entry set to the UE transceiver 162. In some embodiments, the UE transceiver 162 is configured to receive PDCCH containing at least one SFI field from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects the PHR triggering message on the UE transceiver module 162, the UE processor module 168 is further configured to determine at least one second SFI entry set based on at least one predefined algorithm and the received at least one first SFI entry set configured by the BS 102, wherein the at least one predefined algorithm is selected based on other parameters calculated or messages received. The UE processor module 168 is further configured to generate the at least one second SFI entry set and monitor the PDCCH received on the UE transceiver module 162 to further receive the at least one SFI field. As used herein, "SFI entry set" means SFI table or SFI entries.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel). For purposes of clarity of illustration, such a broadcasted first signal is herein referred to as "first broadcast signal." It is noted that the BS 102 may subsequently broadcast one or more signals carrying some other system information through respective channels (e.g., a Physical Downlink Shared Channel (PDSCH)), which are herein referred to as "second broadcast signal," "third broadcast signal," and so on.

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (de-mapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

Figure 2:
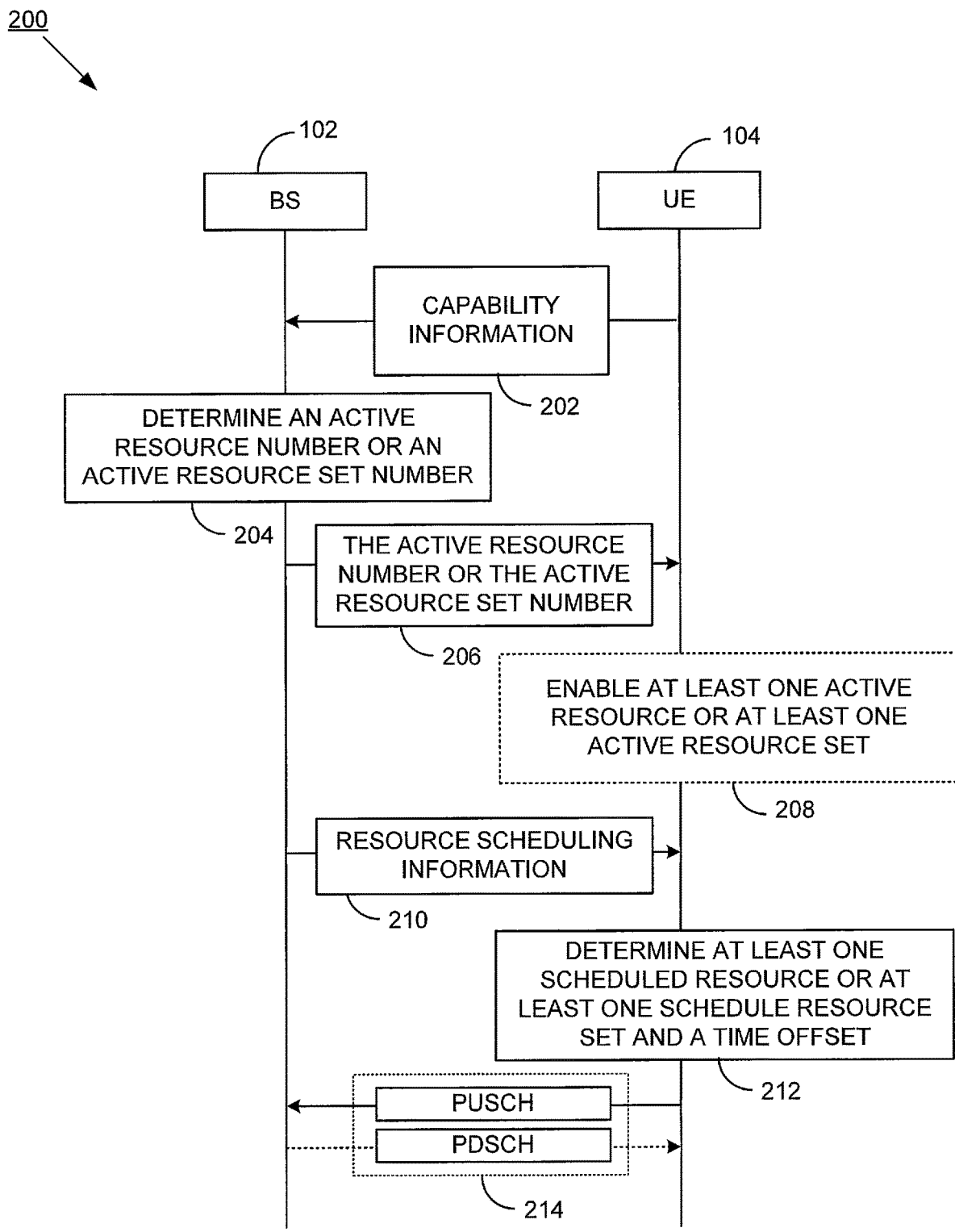
FIG. 2 illustrates a method of performing a resource indication in a wireless communication system, in accordance with some embodiments of the present disclosure.

FIG. 2 illustrates a method 200 of performing a resource indication in a wireless communication system, in accordance with some embodiments of the present disclosure. It is understood that additional operations may be provided before, during, and after the method 200 of FIG. 2, and that some operations illustrated in the method 200 of FIG. 2 may be omitted and re-ordered. In the illustrated embodiment, there is a BS 102 and a UE 104 in a communication system. Although only 1 UE 104 is shown in the system, any desired number of UEs 104 may be included in the system while remaining within the scope of the present disclosure.

The method 200 starts with operation 202 in which capability information of the UE 104 is transmitted to the BS 102 according to some embodiments. In some embodiments, the capability information of the UE 104 is transmitted from the UE 104 to the BS 102 on physical uplink shared channel (PUSCH). In some embodiments, the capability information of the UE 104 is transmitted from the UE 104 to the BS 102 during an initial access process, for example, when the UE 104 enters to a new cell. In some embodiments, the capability information of the UE 104 transmitted from the UE 104 to the BS 102 comprises at least one of the following: a maximum number of resources that the UE 104 can support, a maximum number of resource sets that the UE 104 can support, and a maximum number of resources in each of the resource sets. In some other embodiments, the capability information of the UE 104 can be indicated by a capability index, which can be transmitted from the UE 104 to the BS 102 on PUSCH. In some embodiments, the capability index can be used to locate the capability information according to a capability-index mapping, which can be preconfigured by the system. In some embodiments, the resource can be scheduled for wireless communications between the BS 102 and the UE 104, including PUSCH or physical downlink shared channel (PDSCH).

In some embodiments, the resource can be at least one of the following: a reference signal port, an antenna port, a transmission layer, and a reference signal resource. In some embodiment, a transmission layer is a layer on which the PDSCH/PUSCH is mapped. In some embodiments, the reference signal can be at least one of the following user equipment (UE)-specified reference signal, demodulation reference signal (DMRS), sounding reference signal (SRS), channel state information-reference signal (CSI-RS), and phase tracking-reference signal (PT-RS). Specifically, the resource for both downlink (DL) transmission and uplink (UL) transmission can be at least one of the following: a reference signal resource, a reference signal port, and an antenna port. In some embodiments, a plurality of UE's 104 in a cell may comprise different capabilities. Specifically, the plurality of UE's 104 each may support a different maximum number of resources, a different maximum number of resource sets, and a different number or resources in each of the resource sets. In some embodiments, the capability information from the plurality of UE's 104 can be different and can be used by the BS 102 to further determine different resource sets or different numbers of resource sets for the plurality of UE's 104.

The method 200 continues with operation 204 in which an active resource number or active resource set number is determined according to some embodiments. The active resource or active resource set is a resource or resource set that can be potentially scheduled resources. Noted that "active resource" is a name that used to differentiate with other resources, it can be denoted by others and should not be limited by the denotation in this disclosure. In some embodiments, the active resource number is a number of resources that is smaller than or equal to the maximum number of resources that is supported by the UE 104 according to the capability information. In some embodiments, the number of active resource sets is equal to or smaller than the maximum number of resource sets that are supported by the UE 104. In some embodiments, the number of the at least one active resource is determined according to the capability information. In some embodiments, the number of the at least one active resource set is determined according to the capability information. In some embodiments, the number of active resource is indicated by information of channel state information-reference signal (CRI-RS) resource. In the communication system, the CRI-RS is used for channel estimation, the active resource, specifically, the active antenna ports can be referred from the CRI-RS resource.

In some embodiments, the active resource further comprises at least one of the following: active antenna ports, active transmission layers, active reference signal ports, active reference signal resources, active antenna port sets, active reference signal port sets, active reference signal resource sets, etc. In some embodiments, the reference signal can be at least one of the following user equipment (UE)-specified reference signal, demodulation reference signal (DMRS), sounding reference signal (SRS), channel state information-reference signal (CSI-RS), and phase tracking-reference signal (PT-RS).

The method 200 continues with operation 206 in which the active resource number or active resource set number is transmitted to the UE 104 according to some embodiments. In some embodiments, the active resource number or the active resource set number is transmitted through a downlink control information (DCI) signaling or a higher-layer signaling, for example a media access control (MAC) control element (CE), a radio resource control (RRC) signaling, and a system information block (SIB).

The method 200 continues with operation 208 in which the UE 104 selects and enables at least one active resource or active resource set according to some embodiments. In some embodiments, the number of the at least one active resource or active resource set equals to the active resource number determined by and transmitted from the BS 102. In some embodiments, the number of the at least one active resource is equal to or smaller than the maximum number of resources that are supported by the UE 104. In some embodiments, the number of the at least one active resource set is equal to or smaller than the maximum number of resource sets that are supported by the UE 104. As described above, the number of potentially scheduled resources, i.e., "active resources", in this disclosure is informed to UE 104 by BS 102 in a separate step. In some embodiments, the UE 104 can enable the corresponding resources and processing units without receiving the active resource number from the BS 102. It is unnecessary for the UE 104 to enable a number of resources and processing units more than that of the active resources, which is beneficial for UE 104 in terms of lowering its power consumption before the scheduled resources are determined. In some embodiments, operation 208 can be omitted according to different applications.

The method 200 continues with operation 210 in which resource scheduling information is transmitted from the BS 102 to the UE 104 according to some embodiments. In some embodiments, the resource scheduling information is transmitted using a DCI on physical downlink control channel (PDCCH). In some other embodiments, the resource scheduling information can be transmitted on a higher layer signaling (e.g., MAC CE, RRC signaling, and SIB). In some embodiments, the resource scheduling information further comprises at least one of the following: scheduled resources, scheduled antenna ports, scheduled transmission layers, scheduled reference signal ports, scheduled reference signal resources, scheduled resource sets, scheduled antenna port sets, scheduled reference signal port sets, and scheduled reference signal resource sets. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

The method 200 continues with operation 212 in which a time offset between the signaling and the scheduled PDSCH/PUSCH is determined according to some embodiments. In the communication system, the time offset between the signaling and the PDSCH/PUSCH can be determined by BS 102, a minimum value of which is specified according to various embodiments presented in this disclosure. In some embodiments, the minimum value of the time offset is determined according to a minimum latency required by UE 104, for example, to respond to the DCI transmitted from BS 102. In some embodiments, the minimum value of the time offset is a minimum latency indicated by the BS 102, for example, to guarantee the UE 104 to respond to the DCI. In some embodiments, within the minimum time offset, the UE 104 assumes no wireless communication is scheduled by the DCI between the UE 104 and the BS 102 (i.e., no receiving PDSCH or transmitting PUSCH).

In some embodiments, the time offset is determined by the at least one scheduled resource and the at least one active resource according to the conditions discussed in detail below. In some embodiments, the time offset is determined by the BS 102 then transmitted to the corresponding UE 104, which can be then determined by the UE 104 by decoding the information. In some other embodiments, the time offset is determined directly by the UE 104 after decoding the resource scheduling information and obtaining the at least one scheduled resource. The UE further continues to determine the time offset by comparing the at least one scheduled resource and the at least one active resource.

In some embodiments, the number of scheduled resources is equal to or smaller than the number of active resource, the minimum time offset K1 is required before proceeding to the wireless communications, e.g., transmitting PUSCH to the BS 102 or receiving PDSCH from the BS 102. In some embodiments, when the number of scheduled transmission layers is equal to or smaller than the number of active transmission layers the minimum time offset K1 is required before proceeding to the wireless communications, e.g., transmitting PUSCH to the BS 102 or receiving PDSCH from the BS 102. In some embodiments, when the number of scheduled resource sets is equal to or smaller than the number of active resource sets, the minimum time offset K1 is required before proceeding to the wireless communications, e.g., transmitting PUSCH to the BS 102 or receiving PDSCH from the BS 102. In some embodiments, when the number of scheduled reference signal ports is equal to or smaller than the number of active reference signal ports, the minimum time offset K1 is required before proceeding to the wireless communications, e.g., transmitting PUSCH to the BS 102 or receiving PDSCH from the BS 102. In some embodiments, when the number of scheduled antenna ports is equal to or smaller than the number of active antenna ports, the minimum time offset K1 is required before proceeding to the wireless communications, e.g., transmitting PUSCH to the BS 102 or receiving PDSCH from the BS 102. In some embodiments, when the number of scheduled reference signal resources is equal to or smaller than the number of active reference signal resources, the minimum time offset K1 is required before proceeding to the wireless communications, e.g., transmitting PUSCH to the BS 102 or receiving PDSCH from the BS 102. In some embodiments, when the number of scheduled reference signal resource sets is equal to or smaller than the number of active reference signal resource sets, the minimum time offset K1 is required before proceeding to the wireless communications, e.g., transmitting PUSCH to the BS 102 or receiving PDSCH from the BS 102.

In some embodiments, when the number of scheduled resources is greater than the number of active resources, a minimum time offset K2 is required before proceeding to the wireless communications, e.g., transmitting PUSCH to the BS 102 or receiving PDSCH from the BS 102. In some embodiments, when the number of scheduled transmission layers is greater than the number of active transmission layers, a minimum time offset K2 is required before proceeding to the wireless communications, e.g., transmitting PUSCH to the BS 102 or receiving PDSCH from the BS 102. In some embodiments, when the number of scheduled resource sets is greater than the number of active resource sets, the minimum time offset K2 is required before proceeding to the wireless communications, e.g., transmitting PUSCH to the BS 102 or receiving PDSCH from the BS 102. In some embodiments, when the number of scheduled reference signal ports is greater than the number of active reference signal ports, the minimum time offset K2 is required before proceeding to the wireless communications, e.g., transmitting PUSCH to the BS 102 or receiving PDSCH from the BS 102. In some embodiments, when the number of scheduled antenna ports is greater than the number of active antenna ports, the minimum time offset K2 is required before proceeding to the wireless communications, e.g., transmitting PUSCH to the BS 102 or receiving PDSCH from the BS 102. In some embodiments, when the number of scheduled reference signal resources is greater than the number of active reference signal resources, the minimum time offset K2 is required before proceeding to the wireless communications, e.g., transmitting PUSCH to the BS 102 or receiving PDSCH from the BS 102. In some embodiments, when the number of scheduled reference signal resource sets is greater than the number of active reference signal resource sets, the minimum time offset K2 is required before proceeding to the wireless communications, e.g., transmitting PUSCH to the BS 102 or receiving PDSCH from the BS 102.

In some embodiments, the time offset (including K1 and K2) is defined between the first OFDM symbol of the signaling (e.g. the DCI or a higher layer signaling) with the resource scheduling information and the first OFDM symbol of the PUSCH or PDSCH scheduled by the signaling. In some embodiments, the time offset (including K1 and K2) is defined between the reception of the signaling (e.g. DCI, and higher layer signaling) with the resource scheduling information and the first OFDM symbol of the PUSCH or PDSCH scheduled by the signaling. In some embodiments, the time offset can be configured by the higher layer parameter (e.g. MAC CE, RRC signaling, and SIB). In some embodiments, the minimum time offset (i.e., K1 and K2) can be indicated through the DCI. In some embodiments, the minimum time offset (i.e., K1 and K2) can be a predetermined value. The minimum time offset is required so as to allow enough time for the UE 104 to enable resources and associated processing units corresponding to the at least one scheduled resource for the wireless communications. In some embodiments, the minimum time offset K1 is smaller than the minimum time offset K2. In some embodiments, the minimum time offset K1 can be zero.

In some embodiments, values of K1 and K2 are determined by the capability of the UE 104. For example, for different UE's 104 with different capability, a set of time offset values, $\{ki\}$, is pre-defined by the system, wherein $1 \leq i \leq C$ and C is a positive integer. In some embodiments, rules for selecting time offsets under different situations can be also pre-defined by the system. In some embodiments, when the BS 102 determines scheduled resources or when the UE 104 receives the scheduled resources, a time offset value can be determined. For another example, a pre-defined set of time offset values, $\{ki\}$, is configured by the system, wherein $1 \leq i \leq C$ and C is a positive integer. In some embodiments, the BS 102 selects a largest time offset value from the pre-defined set of time offset values, to allow different resource scheduling for different UE's 104.

In some embodiments, when the number of scheduled resources or resource sets by the BS 102 is increased, or the number of the active resource or active resource sets by the DCI is changed, an increased minimum time offset is required so as to allow the UE 104 to respond to the scheduling signaling, i.e., K2 is larger than K1. With the increased minimum time offset, the scheduling flexibility is unimpaired and at the same time UE 104 does not need to enable too many resources and the corresponding processing units thus the power assumption is remained low.

In some embodiments, the number of active resource or active resource sets can be updated according to the number of at least one resource scheduled by the DCI signaling. In some embodiments, once the resources scheduling information is received or the resources scheduling information is successfully decoded or when one of the following is received by the BS 102 or transmitted by the UE 104, including an acknowledgement, a negative acknowledgement, and PUSCH, the number of active resources or the number of active resource sets can be updated according to the number of the scheduled resources by the signaling. For example, if the number of active resources is smaller than the number of resources scheduled by the signaling, the number of active resources can be updated as the number of resources scheduled by the signaling. For another example, if the number of active resource sets is smaller than the number of resource sets scheduled by the signaling, the number of active resource sets can be updated as the number of resource sets scheduled by the signaling.

In some embodiments, the number of the resources or resource sets scheduled by the signaling is smaller than the number of active resources or active resource sets. In this case, in order to update the number of active resources or active resource sets, a separate activation operation is required, which can be performed by a higher layer signaling (e.g., MAC CE, RRC signaling, and SIB) or a different DCI signaling/information field. In some embodiments, if the number of active resource or active resource sets is updated by higher layer parameter (e.g. MAC CE, RRC signaling, and SIB) or DCI, a minimum time offset is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is smaller than the previous one, the minimum time offset K is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is larger than the previous one, the minimum time offset K2 is required before proceeding to the wireless communications, e.g., transmitting PUSCH to the BS 102 or receiving PDSCH from the BS 102.

In a communication system, a signaling comprises a plurality of information fields for indicating different information. For example, some of the plurality of information fields in the DCI can be used for resource allocation in the time-frequency domain. In some other embodiments, some of the plurality of information fields in the signaling can be used for the indication of activation information.

In some embodiments, the number of active resource or active resource sets can be updated by a higher-layer parameter (e.g. MAC CE, RRC signaling, and SIB) or the DCI. In some embodiments, the number of active resources or active resource sets can be updated by the DCI, wherein a specific information field in the DCI can be used to indicate the number of active resources and another specific information field in the same DCI can be used to indicate the scheduling resource information. In some embodiments, the number of active resources or active resource sets can be updated by the DCI, wherein the DCI used to indicate the number of active resource or active resource sets is different from the DCI that indicates the scheduling resource information. In some embodiments, if the number of active resource or active resource sets is updated by a higher-layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is smaller than the previous one, the minimum time offset K1 is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is larger than the previous one, the minimum time offset K2 is required before proceeding to the wireless communications, e.g., transmitting PUSCH to the BS 102 or receiving PDSCH from the BS 102.

Figure 3:
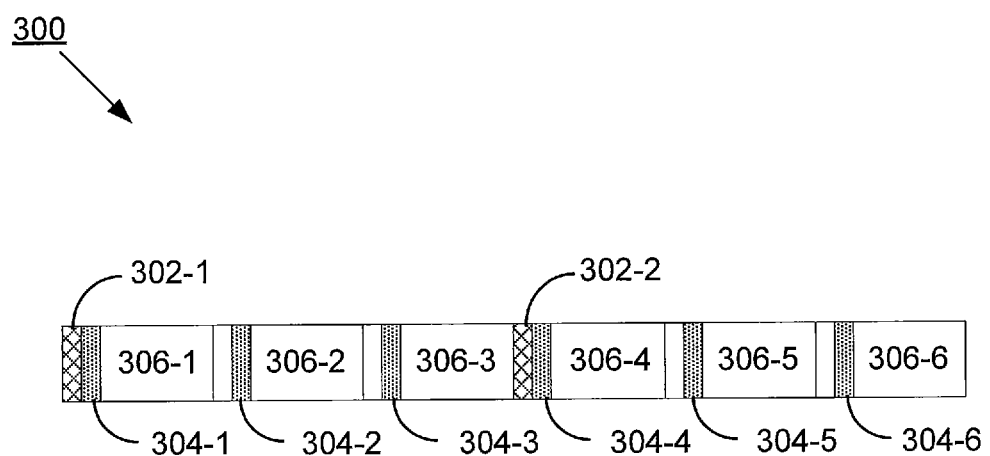
FIG. 3 illustrates a schematic of a configuration of resource blocks, in accordance with some embodiments of the present disclosure.

FIG. 3 illustrates a schematic 300 of a configuration of resource allocation in time domain, in accordance with some embodiments of the present disclosure. In some embodiments, the number of active resource or active resource set is indicated in first DCI 302. In some embodiments, the updated information of the number of active resource or active resource set is indicated in first DCI 302. In some embodiments, the information of scheduling resource is indicated in a second DCI 304. In some embodiments, the information of scheduling resource indicated in the second DCI 304 may be restrained by the number of active resource is indicated in the first DCI 302. In some embodiments, resource blocks 306 are used for wireless communications (e.g., PDSCH or PUSCH transmission) scheduled by the first and second DCI 302/304.

In some embodiments, the effective period of first DCI 302 is longer than the period of second DCI 304. In some embodiments, an effective period of the first DCI 302 is K time slot or K orthogonal frequency-division multiplexing (OFDM) symbols. In some embodiments, K can be a pre-determined value. In some embodiments, K can be configured by a higher layer signaling. In some embodiments, the effective period of the first DCI 302 can be also determined by a timer. Referring to FIG. 3, the first DCI 302-1 determines the number of resources in each of the second DCI's 304-1, 304-2 and 304-3. Similarly, the first DCI 302-2 determines the number of resources in each of the second DCI's 304-4, 304-5 and 304-6.

The first DCI 302 can be differentiated from the second DCI 304 using different methods. In some embodiments, the first DCI 302 and the second DCI 304 comprise a specific information field. For example, when a bit value in the specific information field equals to 0 or 1, the DCI is a first DCI 302, otherwise it is a second DCI 304. In some embodiments, the length of total information field can be used to differentiate between the first DCI 302 and the second DCI 304. In some embodiments, the first DCI 302 comprises a different resource-time/frequency mapping method compared to that of the second DCI 304. In some other embodiments, the first DCI 302 may use a different RNTI (radio network temporary identifier) or a scrambling mask during a scrambling process compared to that used in the second DCI 304.

In some embodiments, the number of active resources or active resource sets is indicated by the channel state information-reference signal (CRI-RS) resource. In some embodiments, the CRI-RS resource is determined by the transmission configuration indicator (TCI) carried in the DCI.

In some other embodiments, the number of active resources or active resource sets can be determined by a timer. In some embodiments, a default number of active resources or active resource sets can be configured (e.g. by a higher-layer parameter or the DCI). In some embodiments, a timer can be triggered by some conditions, for example, when a UE 104 detects a DCI signaling with a grant. After the timer terminates, the number of active resources or active resource sets is the default one.

In some embodiments, an overhead for the indication of the information of the at least one scheduled resource or resource set in the signaling is determined by the maximum number of or a maximum index of resources or a maximum number of resource sets supported by the UE 104. In some embodiments, an overhead for the indication of information of the at least one scheduled resource information in the signaling is determined by the number of active resources or active resource sets. In some embodiments, when the number of active resources or active resource sets is changed, the interpretation of the scheduling resource information needs to be specified. In some embodiments, when a bitwidth of the information field is smaller than the one required for the number of active resources or resource sets indicated by the signaling, zeros can be appended or prepended to the corresponding information field in the signaling. Similarly, in some other embodiments, when a bitwidth of the information field is greater than the one required for the number of active resources or resource sets indicated by the signaling, a number of most or least significant bits in the information field can be used for the interpretation of the resource scheduling information.

The method 200 continues with operation 214 in which a wireless communication is initiated according to some embodiments. In some embodiments, the wireless communications comprises the UE 104 receiving PDSCH from the BS 102 or the UE 104 transmitting PUSCH to the BS 102 on the at least one scheduled resource using the at least one corresponding antenna port.

Figure 4:
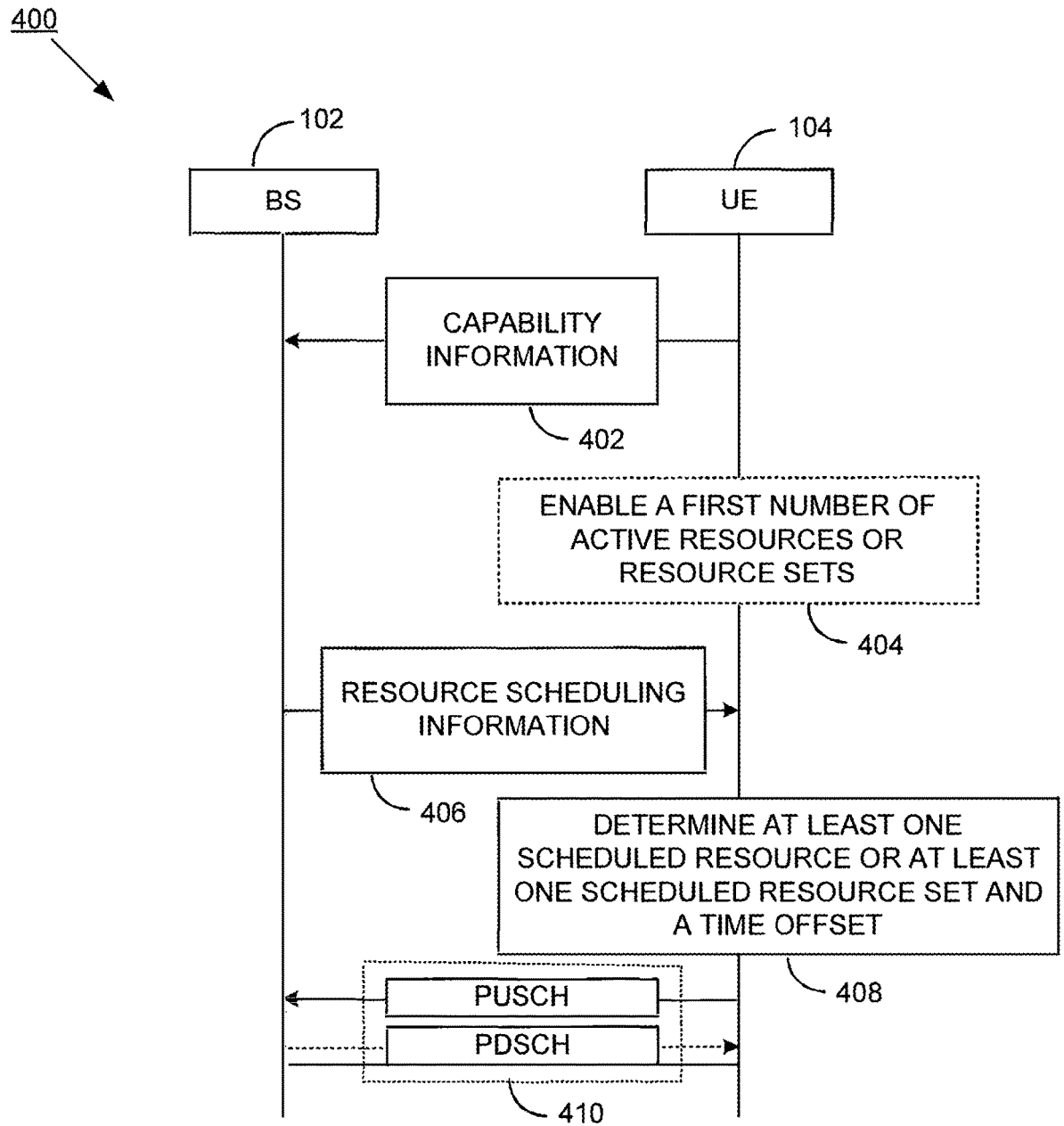
FIG. 4 illustrates a method of performing a resource indication in a wireless communication system, in accordance with some embodiments of the present disclosure.

FIG. 4 illustrates a method 400 of performing a resource indication in a wireless communication system, in accordance with some embodiments of the present disclosure. It is understood that additional operations may be provided before, during, and after the method 400 of FIG. 4, and that some operations illustrated in the method 400 of FIG. 4 may be omitted and re-ordered. In the illustrated embodiment, there is a BS 102 and a UE 104 in a communication system. Although only 1 UE 104 is shown in the system, any desired number of UEs 104 may be included in the system while remaining within the scope of the present disclosure.

The method 400 starts with operation 402 in which capability information of the UE 104 is transmitted to the BS 102 according to some embodiments. In some embodiments, the capability information of the UE 104 is transmitted from the UE 104 to the BS 102 on physical uplink shared channel (PUSCH). In some embodiments, the capability information of the UE 104 is transmitted from the UE 104 to the BS 102 during an initial access process, for example, when the UE 104 enters to a new cell. In some embodiments, the capability information of the UE 104 transmitted from the UE 104 to the BS 102 comprises at least one of the following: a maximum number of resources that the UE 104 can support, a maximum number of resource sets that the UE 104 can support, and a maximum number of resources in each of the resource sets. In some other embodiments, the capability information of the UE 104 can be indicated by a capability index, which can be transmitted from the UE 104 to the BS 102 on PUSCH. In some embodiments, the capability index can be used to locate the capability information according to a capability-index mapping, which can be preconfigured by the system. In some embodiments, the resource can be scheduled for wireless communications between the BS 102 and the UE 104, including PUSCH or physical downlink shared channel (PDSCH).

In some embodiments, the resource can be at least one of the following: reference a signal port, an antenna port, a transmission layer, and a reference signal resource. In some embodiments, a transmission layer is a layer on which PDSCH/PUSCH is mapped. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS). Specifically, the resource for both downlink (DL) transmission and uplink (UL) transmission can be at least one of the following: a reference signal resource, a reference signal port, and an antenna port. In some embodiments, a plurality of UE's 104 in a cell may comprise different capabilities. Specifically, the plurality of UE's 104 each may support a different maximum number of resources, a different maximum number of resource sets, and a different number or resources in each of the resource sets. In some embodiments, the capability information from the plurality of UE's 104 can be different and can be used by the BS 102 to further determine different resource sets or different numbers of resource sets for the plurality of UE's 104.

The method 400 continues with operation 404 in which the UE 104 selects and enables a first number of active resources or active resource sets according to some embodiments. In some embodiments, the first number of the active resources is pre-defined by the system, wherein the first number of the active resources is defined as operator_1 ($m \times M$), wherein M is the maximum number of resources supported by the UE 102 and m is a predefined value which $0 \leq m \leq 1$, wherein the operator_1 comprises one of the following operators: floor (.), round (.), and ceil (.). In some embodiments, the UE 104 enables all the resources supported by the UE 104, when m=1. In some embodiments, the UE 104 disables all the resources supported by the UE 104, when m=0. In some embodiments, the first number of active resources is equal to or smaller than the maximum number of resources that are supported by the UE 104. In some embodiments, the first number of the active resource sets is pre-defined by the system, wherein the first number of the active resources is defined as operator_1 ($n \times L$), wherein L is the maximum number of resource sets supported by the UE 102 and n is a predefined value which $0 \leq n \leq 1$, wherein the operator_1 comprises one of the following operators: floor (.), round (.), and ceil (.). In some embodiments, the UE 104 enables all the resources supported by the UE 104, when n=1. In some embodiments, the UE 104 disables all the resources supported by the UE 104, when n=0. In some embodiments, the first number of active resources is equal to or smaller than the maximum number of resources that are supported by the UE 104. In some embodiments, the first number of active resource sets is equal to or smaller than the maximum number of resource sets that are supported by the UE 104. As described above, the number of potentially scheduled resources, i.e., "active resources", in this disclosure is informed to the UE 104 by the BS 102 in a separate step. In some embodiments, the UE 104 can enable the corresponding resources and processing units without receiving the active resource number from the BS 102. It is unnecessary for the UE 104 to enable a number of resources and processing units more than that of the active resources, which is beneficial for UE 104 in terms of lowering its power consumption before the scheduled resources are determined. In some embodiments, operation 404 can be omitted according to different applications.

In some embodiments, the active resource further comprises at least one of the following: an active antenna port, an active transmission layers an active reference signal port, an active reference signal resource, an active antenna port set, an active reference signal port set, and active reference signal resource sets. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

The method 400 continues with operation 406 in which resource scheduling information is transmitted from the BS 102 to the UE 104 according to some embodiments. In some embodiments, the resource scheduling information is transmitted using a DCI on physical downlink control channel (PDCCH). In some other embodiments, the resource scheduling information can be transmitted on a higher layer signaling (e.g., MAC CE, RRC signaling, and SIB). In some embodiments, the resource scheduling information comprises at least one of the following: a scheduled resource, a scheduled antenna port, a scheduled transmission layer, a scheduled resource set, a scheduled reference signal port, a scheduled reference signal resource, a scheduled resource set, a scheduled antenna port set, a scheduled reference signal port set, and a scheduled reference signal resource set. In some embodiments, the reference signal can be at least one of the following user equipment (UE)-specified reference signal, demodulation reference signal (DMRS), sounding reference signal (SRS), channel state information-reference signal (CSI-RS), and phase tracking-reference signal (PT-RS).

The method 400 continues with operation 408 in which a time offset between the signaling and the scheduled PDSCH/PUSCH is determined according to some embodiments. In the communication system, the time offset between the signaling and the PDSCH/PUSCH can be determined by BS 102, a minimum value of which is specified according to various embodiments presented in this disclosure. In some embodiments, the minimum time offset value is a minimum latency required by UE 104, for example, to respond to the DCI transmitted from BS 102. In some embodiments, the minimum time offset value is a minimum latency indicated by BS 102, for example, to allow the UE 104 to respond to the DCI. In some embodiments, within the minimum time offset value, the UE 104 assumes no wireless communication is scheduled by the DCI between the UE 104 and the BS 102 (i.e., no receiving PDSCH or transmitting PUSCH).

In some embodiments, the time offset is determined by the at least one scheduled resource and the at least one active resource according to the conditions discussed in detail below. In some embodiments, the time offset is determined by the BS 102 after obtaining the at least one scheduled resource for the corresponding UE 104. The time offset determined by the BS 102 can be then transmitted to the corresponding UE 104, which can be then determined by the UE 104 by decoding the resource information. In some other embodiments, the time offset is determined directly by the UE 104 after decoding the resource scheduling information and obtaining the at least one scheduled resource. The UE further continues to determine the time offset by comparing the at least one scheduled resource and the at least one active resource.

In some embodiments, the number of scheduled resources is equal to or smaller than the number of active resource, the minimum time offset K1 is required before proceeding to the wireless communications, e.g., transmitting PUSCH to the BS 102 or receiving PDSCH from the BS 102. In some embodiments, when the number of scheduled transmission layers is equal to or smaller than the number of active transmission layers, a minimum time offset K1 is required before proceeding to the wireless communications, e.g., transmitting PUSCH to the BS 102 or receiving PDSCH from the BS 102. In some embodiments, when the number of scheduled resource sets is equal to or smaller than the number of active resource sets, the minimum time offset K1 is required before proceeding to the wireless communications, e.g., transmitting PUSCH to the BS 102 or receiving PDSCH from the BS 102. In some embodiments, when the number of scheduled reference signal ports is equal to or smaller than the number of active reference signal ports, the minimum time offset K1 is required before proceeding to the wireless communications, e.g., transmitting PUSCH to the BS 102 or receiving PDSCH from the BS 102. In some embodiments, when the number of scheduled antenna ports is equal to or smaller than the number of active antenna ports the minimum time offset K1 is required before proceeding to the wireless communications, e.g., transmitting PUSCH to the BS 102 or receiving PDSCH from the BS 102. In some embodiments, when the number of scheduled reference signal resources is equal to or smaller than the number of active reference signal resources, the minimum time offset K1 is required before proceeding to the wireless communications, e.g., transmitting PUSCH to the BS 102 or receiving PDSCH from the BS 102. In some embodiments, when the number of scheduled reference signal resource sets is equal to or smaller than the number of active reference signal resource sets, the minimum time offset K1 is required before proceeding to the wireless communications, e.g., transmitting PUSCH to the BS 102 or receiving PDSCH from the BS 102.

In some embodiments, when the number of scheduled resources is greater than the number of active resources, a minimum time offset K2 is required before proceeding to the wireless communications, e.g., transmitting PUSCH to the BS 102 or receiving PDSCH from the BS 102. In some embodiments, when the number of scheduled transmission layers is greater than the number of active transmission layers, a minimum time offset K2 is required before proceeding to the wireless communications, e.g., transmitting PUSCH to the BS 102 or receiving PDSCH from the BS 102. In some embodiments, when the number of scheduled resource sets is greater than the number of active resource sets, the minimum time offset K2 is required before proceeding to the wireless communications, e.g., transmitting PUSCH to the BS 102 or receiving PDSCH from the BS 102. In some embodiments, when the number of scheduled reference signal ports is greater than the number of active reference signal ports, the minimum time offset K2 is required before proceeding to the wireless communications, e.g., transmitting PUSCH to the BS 102 or receiving PDSCH from the BS 102. In some embodiments, when the number of scheduled antenna ports is greater than the number of active antenna ports, the minimum time offset K2 is required before proceeding to the wireless communications, e.g., transmitting PUSCH to the BS 102 or receiving PDSCH from the BS 102. In some embodiments, when the number of scheduled reference signal resources is greater than the number of active reference signal resources, the minimum time offset K2 is required before proceeding to the wireless communications, e.g., transmitting PUSCH to the BS 102 or receiving PDSCH from the BS 102. In some embodiments, when the number of scheduled reference signal resource sets is greater than the number of active reference signal resource sets, the minimum time offset K2 is required before proceeding to the wireless communications, e.g., transmitting PUSCH to the BS 102 or receiving PDSCH from the BS 102.

In some embodiments, the time offset (including K1 and K2) is defined between the first OFDM symbol of the DCI signaling for the resource scheduling information and the first OFDM symbol of the PUSCH or PDSCH scheduled by the signaling. In some embodiments, the minimum time offset (i.e., K1 and K2) is defined between the reception of the signaling (e.g. the DCI, or a higher layer signaling) with the resource scheduling information and the first OFDM symbol of the PUSCH or PDSCH scheduled by the signaling. In some embodiments, the minimum time offset can be configured by the higher layer parameter (e.g. MAC CE, RRC signaling, and SIB). In some embodiments, the minimum time offset (i.e., K1 and K2) can be indicated through DCI. In some embodiments, the minimum time offset (i.e., K1 and K2) can be a pre-determined value. The minimum time offset is required so as to allow enough time for the UE 104 to enable resources and associated processing units corresponding to the at least one scheduled resource for the wireless communications. In some embodiments, the minimum time offset K1 is smaller than the minimum time offset K2. In some embodiments, the minimum time offset K1 can be zero.

In some embodiments, values of K1 and K2 are determined by the capability of the UE 104. For example, for different UE's 104 with different capability, a set of time offset values, {ki}, is pre-defined by the system, wherein 1≤i≤C and C is a positive integer. In some embodiments, rules for selecting time offsets under different situations can be also pre-defined by the system. In some embodiments, when the BS 102 determines scheduled resources or when the UE 104 receives the scheduled resources, a time offset value can be determined. For another example, a pre-defined set of time offset values, {ki}, is configured by the system, wherein 1≤i≤C and C is a positive integer. In some embodiments, the BS 102 selects a largest time offset value from the pre-defined set of time offset values, to allow different resource scheduling for different UE's 104.

In some embodiments, when the number of scheduled resources or resource sets by the BS 102 is increased, or the number of the active resource or active resource sets by the DCI is changed, an increased minimum time offset is required so as to allow the UE 104 to respond to the scheduling signaling, i.e., K2 is larger than K1. With the increased minimum time offset, the scheduling flexibility is unimpaired and at the same time UE 104 does not need to enable too many resources and the corresponding processing units thus the power assumption is remained low.

In some embodiments, the number of active resources or active resource sets can be updated according to the number of at least one resource scheduled by the DCI signaling. In some embodiments, once the resources scheduling information is received or the resources scheduling information is successfully decoded or when at least one of the following is received by the BS 102 or transmitted by the UE 104, including an acknowledgement, a negative acknowledgement, and PUSCH, the number of active resources or the number of active resource sets can be updated according to the number of the scheduled resources by the signaling. For example, if the number of active resources is smaller than the number of resources scheduled by the signaling, the number of active resources can be updated as the number of resources scheduled by the signaling. For another example, if the number of active resource sets is smaller than the number of resource sets scheduled by the signaling, the number of active resource sets can be updated as the number of resource sets scheduled by the signaling.

In some embodiments, the number of the resources or resource sets scheduled by the signaling is smaller than the number of active resources or active resource sets. In this case, in order to update the number of active resources or active resource sets, a separate activation operation is required, which can be performed by a higher layer signaling (e.g., MAC CE, RRC signaling, and SIB) or a different DCI signaling/information field. In some embodiments, if the number of active resource or active resource sets is updated by higher layer parameter (e.g. MAC CE, RRC signaling, and SIB) or DCI, a minimum time offset is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is smaller than the previous one, the minimum time offset K1 is required before proceeding to the wireless communications, e.g., transmitting PUSCH to the BS 102 or receiving PDSCH from the BS 102. In some embodiments, if the updated number of active resource or active resource sets by higher layer parameter (e.g. MAC CE, RRC signaling, and SIB) or DCI is larger than the previous one, the minimum time offset K2 is required before proceeding to the wireless communications, e.g., transmitting PUSCH to the BS 102 or receiving PDSCH from the BS 102.

In some embodiments, the number of active resources or active resource sets can be updated by a higher-layer parameter (e.g. MAC CE, RRC signaling, and SIB) or the DCI. In some embodiments, the number of active resources or active resource sets can be updated by the DCI, wherein a specific information field in the DCI can be used to indicate the number of active resources and another specific field in the same DCI can be used to indicate the scheduling resource information. In some embodiments, the number of active resources or active resource sets can be updated by the DCI, wherein the DCI used to indicate the number of active resource or active resource sets is different from the DCI that indicates the scheduling resource information. In some embodiments, if the number of active resource or active resource sets is updated by a higher-layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, if the updated number of active resource or active resource sets by a higher layer parameter (e.g. MAC CE, RRC signaling, and SIB) or the DCI is smaller than the previous one, the minimum time offset K1 is required before proceeding to the wireless communications, e.g., transmitting PUSCH to the BS 102 or receiving PDSCH from the BS 102. In some embodiments, if the updated number of active resource or active resource sets by a higher layer parameter (e.g. MAC CE, RRC signaling, and SIB) or DCI is larger than the previous one, the minimum time offset K2 is required before proceeding to the wireless communications, e.g., transmitting PUSCH to the BS 102 or receiving PDSCH from the BS 102.

In some embodiments, the number of active resources or active resource sets is indicated by the channel state information-reference signal (CRI-RS) resource. In the communication system, the CRI-RS is used for channel estimation, so the active resource, specifically, the active antenna ports can be referred from the CRI-RS resource. In some embodiments, the CRI-RS resource is determined by the transmission configuration indicator (TCI) carried in DCI.

In some other embodiments, the number of active resources or active resource sets can be determined by a timer. In some embodiments, a default number of active resources or active resource sets can be configured (e.g. by a higher-layer parameter or DCI). In some embodiments, a timer can be triggered by some conditions, for example, when a UE 104 detects a DCI signaling with a grant. After the timer terminates, the number of active resources or active resource sets is the default one.

In some embodiments, an overhead for the indication of the information of the at least one scheduled resource or resource set in the signaling is determined by the maximum number of or a maximum index of resources or maximum set number supported by the UE 104. In some embodiments, an overhead for the indication of information of the at least one scheduled resource information in the signaling is determined by the number of active resources or active resource sets. In some embodiments, when the number of active resources or active resource sets is changed, the interpretation of the scheduling resource information needs to be specified. In some embodiments, when a bitwidth of the information field is smaller than the one required for the number of active resources or resource sets indicated by the signaling, zeros can be appended or prepended to the corresponding information field in the signaling. Similarly, in some other embodiments, when a bitwidth of the information field is greater than the one required for the number of active resources or resource sets indicated by the signaling, a number of most or least significant bits in the information field can be used for the interpretation of the resource scheduling information.

The method 400 continues with operation 410 in which a wireless communication is initiated according to some embodiments. In some embodiments, the wireless communications comprises the UE 104 receiving PDSCH from the BS 102 or the UE 104 transmitting PUSCH to the BS 102 on the at least one scheduled resource using the at least one corresponding antenna.

Figure 5:
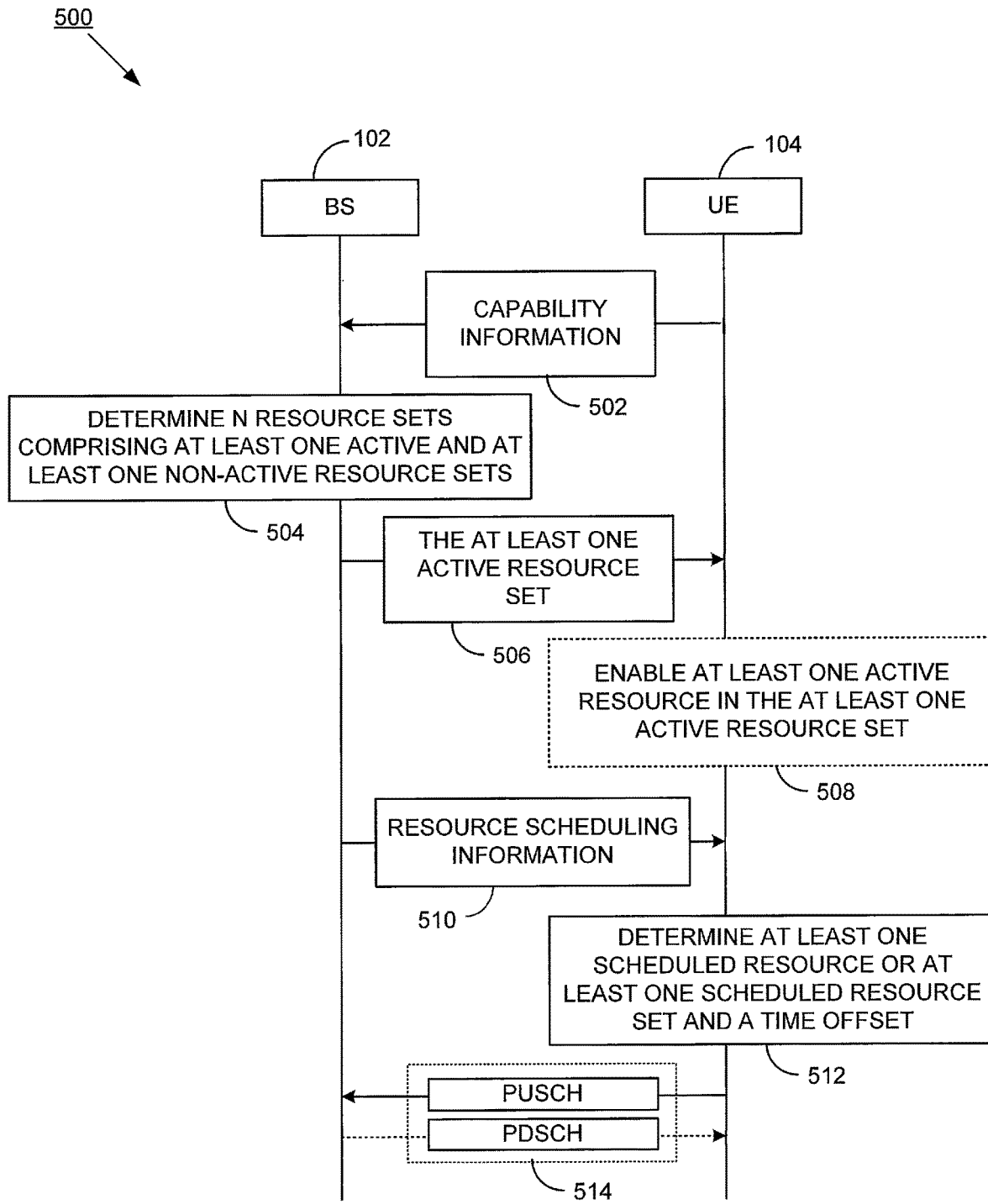
FIG. 5 illustrates a method of performing a resource port indication in a wireless communication system, in accordance with some embodiments of the present disclosure.

FIG. 5 illustrates a method 500 of performing a resource indication in a wireless communication system, in accordance with some embodiments of the present disclosure. It is understood that additional operations may be provided before, during, and after the method 500 of FIG. 5, and that some operations may be omitted or reorganized. In the illustrated embodiment, there is a BS 102 and a UE 104 in a communication system. Although only 1 UE 104 is shown, any desired number of UEs 104 may be included in the system while remaining within the scope of the present disclosure.

The method 500 starts with operation 502 in which capability information of the UE 104 is transmitted to the BS 102 according to some embodiments. In some embodiments, the capability information of the UE 104 is transmitted from the UE 104 to the BS 102 on physical uplink shared channel (PUSCH). In some embodiments, the capability information of the UE 104 is transmitted from the UE 104 to the BS 102 during an initial access process, for example, when the UE 104 enters to a new cell. In some embodiments, the capability information of the UE 104 transmitted from the UE 104 to the BS 102 comprises at least one of the following: a maximum number of resources that the UE 104 can support, a maximum number of resource sets that the UE 104 can support, and a maximum number of resources in each of the resource sets. In some other embodiments, the capability information of the UE 104 can be indicated by a capability index, which can be transmitted from the UE 104 to the BS 102 on PUSCH. In some embodiments, the capability index can be used to locate the capability information according to a capability-index mapping, which can be preconfigured by the system. In some embodiments, the resource can be scheduled for wireless communications between the BS 102 and the UE 104, including PUSCH or physical downlink shared channel (PDSCH).

In some embodiments, the resource can be at least one of the following: a reference signal port, an antenna port, a transmission layer, and a reference signal resource. In some embodiments, a transmission layer is a layer on which the PDSCH/PUSCH is mapped. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS). Specifically, the resource for both downlink (DL) transmission and uplink (UL) transmission can be at least one of the following: a reference signal resource, a reference signal port, and an antenna port. In some embodiments, a plurality of UE's 104 in a cell may comprise different capabilities. Specifically, the plurality of UE's 104 each may support a different maximum number of resources, a different maximum number of resource sets, and a different number or resources in each of the resource sets. In some embodiments, the capability information from the plurality of UE's 104 can be different and can be used by the BS 102 to further determine different resource sets or different numbers of resource sets for the plurality of UE's 104.

The method 500 continues with operation 504 in which N resource sets (N≥2 and N is an integer) are determined by the BS 102 according to some embodiments. In some embodiments, the N resource sets comprise at least one active resource set and at least one non-active resource set. Noted that "active resource" is a name that used to differentiate with other resources, it can be denoted by others and should not be limited by the denotation herein. In some embodiments, the BS 102 groups the plurality of resources supported by the UE 104 and forms a plurality of resource sets (i.e., N resource sets), wherein each of the plurality of resource sets comprises at least one resource. In some embodiments, the at least one resource in each of the N resource sets can be scheduled for wireless communications, including PUSCH or PDSCH. In some embodiments, the N resource sets for a UE 104 can be determined by the BS 102 according to the capability information of the corresponding UE 104.

In some embodiments, the number of resource sets (i.e., N) determined by the BS 102 is smaller than or equal to the maximum number of resource sets (i.e., L, L≥2 and L is an integer) supported by the UE 104, and the number of resources in each resource set is smaller than or equal to the maximum number of resources in each of the resource sets supported by the UE 104. For example, the capability information of the UE 104 comprises a maximum number of resources (i.e. M>0 and M is an integer) supported by the UE 104, a maximum number of resource sets (i.e. L≥2 and L is an integer) supported by the UE 104. In an example, the number of resource in one of the resource sets can be determined by N-floor(N/L)*(N−1), and the number of resource in other resource sets is floor(N/L), wherein the operation floor(.) denotes rounding down, e.g. floor(⁴⁄₅)=4.

Figure 6:
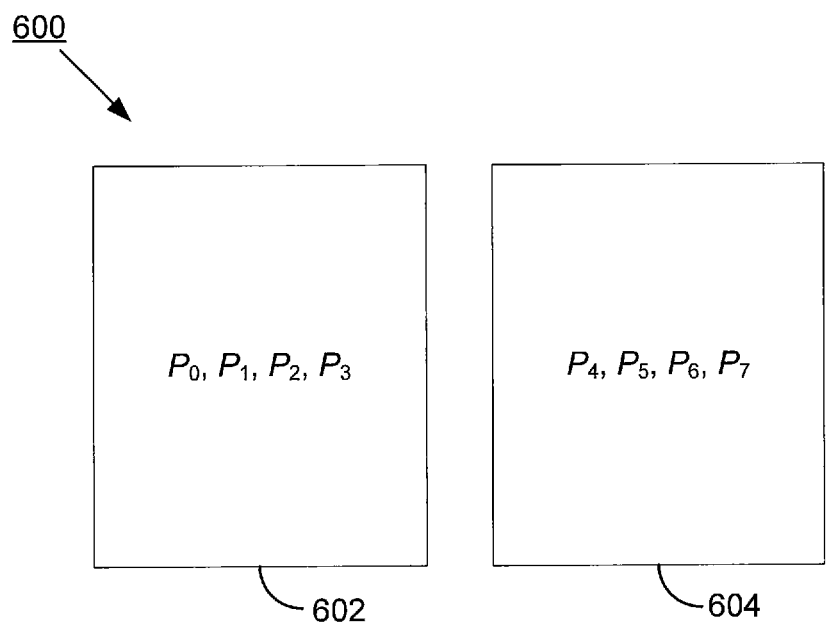
FIG. 6 illustrates an example of resource sets determined by a BS to a UE, in accordance with some embodiments of the present disclosure.

FIG. 6 illustrates an example of resource sets 600 determined by a BS 102 to a UE 104, in accordance with some embodiments of the present disclosure. In the illustrated embodiment, the UE 104 comprises and supports 8 DMRS ports, e.g., $P_i$, wherein i=0, 1, . . . 7. The BS 102 configures these 9 DMRS ports into 2 resource sets for the UE 104, i.e., a first resource set 602 and a second resource set 604. Each resource set 602/604 comprises an equal amount of resources, i.e., 4 DRMS ports. Specifically, the first resource set 602 is configured with 4 DMRS ports, i.e., $P_0$, $P_1$, $P_2$, and $P_3$ in and the second resource set 604 is configured with 4 DMRS ports, i.e., $P_4$, $P_5$, $P_6$, and $P_7$. Although only 8 resources and 2 resource sets are shown in the illustrated embodiment of FIG. 6, it should be noted that there can be any numbers of resources or resource sets and each resource set may comprise a different number of resources, which are within the scope of this present disclosure.

In some embodiments, the N resource sets grouped by the BS 102 comprises resources with continuous indices. The resources in each resource set can be determined using two of the following parameters: a maximum number of resources in a resource set, a maximum index and a minimum index of the resources in the corresponding resource set. In some embodiments, reference signal ports within a same Code Division Multiplexing (CDM) group or a same quasi co-location (QCL) group can be grouped together into a same resource set. For example, referring to FIG. 6 again, if reference signal port $P_0$, $P_1$, $P_2$, and $P_3$ are from the same QCL group, the resources $P_0$, $P_1$, $P_2$, and $P_3$ can be grouped into the same resource set (i.e., the first resource set 602).

Similarly, if reference signal port $P_4$, $P_5$, $P_6$, and $P_7$ are from the same CDM group, the resources $P_4$, $P_5$, $P_6$, and $P_7$ can be grouped into the same resource set (i.e., the second resource set 604).

In some embodiments, the active resources can be indicated by the information of channel state information-reference signal (CRI-RS) resource. In the communication system, the CRI-RS is used for channel estimation, the active resource, specifically, the active antenna ports can be referred from the CRI-RS resource.

In some embodiments, the active resource further comprises at least one of the following: active antenna ports, active transmission layers, active reference signal ports, active reference signal resources, active antenna port sets, active reference signal port sets, and active reference signal resource sets. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

Referring back to FIG. 5 again, the method 500 continues with operation 506 in which an indication of the at least one active resource set in the N resource sets is transmitted from the BS 102 to the UE 104. In some embodiments, the indication of the at least one active resource set in the N resource sets is transmitted to the UE 104 through downlink control information (DCI) or a higher layer signaling on a PDSCH, e.g., a media access control (MAC) control element (CE), a radio resource control (RRC) signaling, and a system information block (SIB).

In some embodiments, the indication of the at least one active resource set in the N resource sets can be achieved by transmitting at least two of its characteristics: a number of resources, a maximum resource index, and a minimum resource index. In some other embodiments, the indication of the at least one active resource set can be also achieved by transmitting the index of the at least one active resource set. In some other embodiments, the indication of the at least one active resource set can be also achieved by transmitting the indexes of the active resources.

In some embodiments, operation 506 also comprises a transmission of the grouped N resource sets from the BS 102 to the UE 104. In some embodiments, the N resource sets can be differentiated by the at least two of the following: a number of resources, a maximum resource index, and a minimum resource index. In some embodiments, the configuration of the N resource sets are stored in a memory unit of the UE 104.

The method 500 continues with operation 508 in which at least one active resource corresponding to the at least one active resource in the at least one active resource set received from the BS 102 is enabled according to some embodiments. In some embodiments, the UE 104 prepares the at least one resource (e.g. reference signal port, reference signal resource, antenna port) for wireless communications, including receiving PDSCH and/or transmitting PUSCH. In some embodiments, operation 508 further comprises enabling at least one processing unit associated to the at least one resource of the UE 104. As described above, only resource and/or processing unit corresponding to the at least one active resource in the at least one active resource set instead of all of the resource supported by the UE 104 are enabled before further receiving resource scheduling information from the BS 102 (e.g., a scheduling signaling in operation 410 which is further discussed in detail below). Therefore, this method presented in this disclosure can reduce power consumption of the UE 104 by limiting the number of enabled resources while maintaining the scheduling flexibility. In some embodiments, operation 508 can be omitted according to different applications.

The method 500 continues with operation 510 in which resource scheduling information is transmitted from the BS 102 to the UE 104 according to some embodiments. In some embodiments, the resource scheduling information is transmitted using a DCI on physical downlink control channel (PDCCH). In some other embodiments, the resource scheduling information can be transmitted on a higher layer signaling (e.g., MAC CE, RRC signaling, and SIB). In some embodiments, the resource scheduling information further comprises at least one of the following: scheduled resources, scheduled antenna ports, scheduled transmission layers, scheduled resource sets, scheduled reference signal ports, scheduled reference signal resources, scheduled resource sets, scheduled antenna port sets, scheduled reference signal port sets, scheduled reference signal resource sets etc. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

The method 500 continue with operation 512 in which a time offset between the signaling and the scheduled PDSCH/PUSCH is determined according to some embodiments. In the communication system, the interval between the scheduling information and the PDSCH/PUSCH can be determined by BS 102, a minimum value of which is specified in various embodiments in the present disclosure. In some embodiments, the minimum time offset is a minimum latency required by UE 104, for example, to respond to the DCI transmitted from BS 102. In some embodiments, the minimum time offset is a minimum latency indicated by BS 102, for example, to allow the UE 104 to respond to the DCI. In some embodiments, within the minimum time offset, the UE 104 assumes no wireless communication is scheduled between the UE 104 and the BS 102, i.e., no receiving PDSCH or transmitting PUSCH that is scheduled by the DCI.

In some embodiments, the time offset is determined by the at least one scheduled resource and the at least one active resource according to the conditions discussed in detail below. In some embodiments, the time offset is determined by the BS 102 then transmitted in the resource scheduling information to the corresponding UE 104, which can be then determined by the UE 104 by decoding the resource scheduling information. In some other embodiments, the time offset is determined directly by the UE 104 after decoding the resource scheduling information and obtaining the at least one scheduled resource. The UE further continues to determine the time offset by comparing the at least one scheduled resource and the at least one active resource.

In some embodiments, when the at least one scheduled resource is a subset of the at least one active resource set, a minimum time offset K1 is required before proceeding to the wireless communications, e.g., transmitting PUSCH to the BS 102 or receiving PDSCH from the BS 102. In some embodiments, when the at least one scheduled reference signal port is a subset of the at least one active reference signal port set, the minimum time offset K1 is required before proceeding to the wireless communications, e.g., transmitting PUSCH to the BS 102 or receiving PDSCH from the BS 102. In some embodiments, when the at least one scheduled antenna port is a subset of the at least active antenna port set, the minimum time offset K1 is required before proceeding to the wireless communications, e.g., transmitting PUSCH to the BS 102 or receiving PDSCH from the BS 102. In some embodiments, when the at least one scheduled reference signal resource is a subset of the at least one active reference signal resource set, the minimum time offset K1 is required before proceeding to the wireless communications, e.g., transmitting PUSCH to the BS 102 or receiving PDSCH from the BS 102.

In some embodiments, when at least one of the at least one scheduled resource is not included in the at least one active resource set, a minimum time offset K2 is required before proceeding to the wireless communications, e.g., transmitting PUSCH to the BS 102 or receiving PDSCH from the BS 102. In some embodiments, when at least one of the at least one scheduled reference signal port is not included in the at least one active reference signal port set, the minimum time offset K2 is required before proceeding to the wireless communications, e.g., transmitting PUSCH to the BS 102 or receiving PDSCH from the BS 102. In some embodiments, when at least one of the at least one scheduled antenna port is not included in the at least one active antenna port set the minimum time offset K2 is required before proceeding to the wireless communications, e.g., transmitting PUSCH to the BS 102 or receiving PDSCH from the BS 102. In some embodiments, when at least one of the at least one scheduled reference signal resource is not included in the at least one active reference signal resource set, the minimum time offset K2 is required before proceeding to the wireless communications, e.g., transmitting PUSCH to the BS 102 or receiving PDSCH from the BS 102.

In some embodiments, the time offset (including K1 and K2) is defined between the first OFDM symbol of the signaling (e.g. the DCI, or a higher layer signaling) with the resource scheduling information and the first OFDM symbol of the PUSCH or PDSCH scheduled by the signaling. In some embodiments, the time offset (including K1 and K2) is defined between the reception of the signaling (e.g. the DCI or a higher layer signaling) with the resource scheduling information and the first OFDM symbol of the PUSCH or PDSCH scheduled by the signaling In some embodiments, the minimum time offset can be configured by the higher layer parameter (e.g. MAC CE, RRC signaling, and SIB). In some embodiments, the minimum time offset (i.e., K1 and K2) can be indicated through the DCI. In some embodiments, the minimum time offset (i.e., K1 and K2) can be a pre-determined value. The minimum time offset is required so as to allow enough time for the UE 104 to enable resources and associated processing units corresponding to the at least one scheduled resource for the wireless communications. In some embodiments, the minimum time offset K1 is smaller than the minimum time offset K2. In some embodiments, the minimum time offset K1 can be zero.

In some embodiments, values of K1 and K2 are determined by the capability of the UE 104. For example, for different UE's 104 with different capability, a set of time offset values, {ki}, is pre-defined by the system, wherein $1 \leq i \leq C$ and C is a positive integer. In some embodiments, rules for selecting time offsets under different situations can be also pre-defined by the system. In some embodiments, when the BS 102 determines scheduled resources or when the UE 104 receives the scheduled resources, a time offset value can be determined. For another example, a pre-defined set of time offset values, {ki}, is configured by the system, wherein $1 \leq i \leq C$ and C is a positive integer. In some embodiments, the BS 102 selects a largest time offset value from the pre-defined set of time offset values, to allow different resource scheduling for different UE's 104.

In some embodiments, when scheduled resources by the BS 102 is different with the active ones, or the number of the active resource or active resource sets by the DCI is changed, an increased minimum time offset is required so as to allow the UE 104 to respond to the scheduling signaling, i.e., K2 is larger than K1. With the increased minimum time offset, the scheduling flexibility is unimpaired and at the same time UE 104 does not need to enable too many resources and the corresponding processing units thus the power assumption is remained low.

In some embodiments, the at least one scheduled resource can only be a subset of the at least one active resource set of the N resource sets configured by the BS 102 for the corresponding UE 104. In this case, in order to activate the at least one scheduled resource, a separate activation operation is required, which can be performed by a higher layer signaling (e.g., MAC CE, RRC signaling, SIB) or a different DCI signaling/information field for activation. Once the at least one scheduled resource that are previously non-active is activated by the separate activation process, the active scheduled resource can then be used for PUSCH/PDSCH transmission. In some embodiments, if the at least one active resource set is updated (e.g. activated or de-activated) by a higher-layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, if at least one active resource set is activated by higher layer parameter (e.g. MAC CE, RRC signaling, and SIB) or DCI is larger than the previous one, a minimum time offset is required before proceeding to the wireless communications, e.g., transmitting PUSCH to the BS 102 or receiving PDSCH from the BS 102.

In some other embodiments, the at least one scheduled resource comprises at least one resource in a non-active resource set. In some embodiments, the at least one active resource set can be updated according to the at least one resource scheduled by the signaling. In some embodiments, once the resources scheduling information is received or the resources scheduling information is successfully decoded or when at least one of the following is received by the BS 102 or transmitted by the UE 104, including an acknowledgement, a negative acknowledgement, and PUSCH, the active resource set can be updated according to the scheduled resources by the signaling. In some embodiments, if the at least one active resource set is updated by a higher-layer parameter (e.g. MAC CE, RRC signaling, SIB) or the DCI, a minimum time offset is required before proceeding to the wireless communications, e.g., transmitting PUSCH to the BS 102 or receiving PDSCH from the BS 102. In some embodiments, if at least one active resource is activated by higher layer parameter (e.g. MAC CE, RRC signaling, and SIB) or DCI a minimum time offset is required before proceeding to the wireless communications, e.g., transmitting PUSCH to the BS 102 or receiving PDSCH from the BS 102.

In some embodiments, the at least one newly active resource indicated by the signaling can be added to the previous active resource set to form a new active resource set. In some embodiments, the at least one newly activated resource indicated by the signaling can be also used to replace the previous active resource set to form a new active resource set. In some other embodiments, the at least one newly activated resource indicated by the signaling can be also used to form a separate active resource set in addition to the previous active resource set.

In some embodiments, the at least one active resource set can be updated by a higher-layer parameter (e.g. MAC CE, RRC signaling, and SIB) or the DCI. In some embodiments, the at least one active resource set can be updated by the DCI, wherein a specific information field in the DCI can be used to update the active resource and another specific information field in the same DCI can be used to indicate the scheduling resource information. In some embodiments, the at least one active resource set can be updated by the DCI, wherein the DCI used to update the at least one active resource set is different from the DCI that indicates the scheduling resource information. In some embodiments, if the at least one active resource set is updated by higher layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, when at least one active resource is activated by a higher layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102.

In some embodiments, when the at least one active resource set in the N resource sets is updated, for example, the BS 102 activates new resources, deactivates previously active resources, etc., the updated information of a new N resource set or the indication of activation/deactivation is transmitted through the higher layer signaling or the DCI from the BS 102 to the UE 104.

In some embodiments, a DCI comprises an information field for indicating at least one resource set as an active resource set or a non-activation resource set, i.e., an indication of resource activation/deactivation. In some other embodiments, a information field in the DCI can be also used to indicate the non-active resource sets, wherein the size of the information field in the DCI is determined by the total number of resource sets (i.e. N) or the total number of active resource sets.

In some other embodiments, the activation or deactivation of a resource or a resource set can be indicated by a higher-layer parameter. For example, the higher layer parameter comprises at least one of the following: radio resource control (RRC) signaling, medium access control (MAC) control element (CE), and system information block (SIB).

In some other embodiments, activation of a resource or a resource set can be determined by a timer. In some embodiments, a default resource or resource set can be configured (e.g., by a higher-layer parameter or the DCI). In some embodiments, a timer can be triggered by some conditions, for example, when a UE 104 detects a DCI signaling with a grant. After the timer terminates, the default resource set can be activated and the resources in the default resource set can be then used as scheduled resources for the wireless communications.

In some embodiments, a same signaling but different information fields are used to activate/deactivate resource or resource set. In some embodiments, different signaling can be used to activate/deactivate resource or resource set.

In some embodiments, the active resources or active resource sets is indicated by the channel state information-reference signal (CRI-RS) resource. In some embodiments, the CRI-RS resource is determined by the transmission configuration indicator (TCI) carried in DCI.

FIG. 3 illustrates a schematic 300 of a configuration of resource allocation in time domain, in accordance with some embodiments of the present disclosure. In some embodiments, first DCI 302 indicates at least one of the following information: at least one active resource set, activation/deactivation resource or resource set. In some embodiments, the information of scheduling resource indicated in the second DCI 304. In some embodiments, the information of scheduling resource indicated in second DCI 304 may be restrained by the firsts DCI 302. In some embodiments, resource blocks 306 are used for wireless communications (e.g., PDSCH or PUSCH transmission) scheduled by the first and second DCI 302/304.

In some embodiments, the effective period of first DCI 302 is longer than the period of second DCI 304. In some embodiments, an effective period of the first DCI 302 is K time slot or K orthogonal frequency-division multiplexing (OFDM) symbols. In some embodiments, K can be a pre-determined value. In some embodiments, K can be configured by a higher layer signaling. In some embodiments, the effective period of the first DCI 302 can be also determined by a timer. Referring to FIG. 3, the first DCI 302-1 determines the number of resources in each of the second DCI's 304-1, 304-2 and 304-3. Similarly, the first DCI 302-2 determines the scheduling resources in each of the second DCI's 304-4, 304-5 and 304-6.

The first DCI 302 can be differentiated from the second DCI 304 using different methods. In some embodiments, the first DCI 302 and the second DCI 304 comprise a specific information field. For example, when a bit value in the specific information field equals to 0 or 1, the DCI is a first DCI 302, otherwise it is a second DCI 304. In some embodiments, the length of total information field can be used to differentiate the first DCI 302 and the second DCI 304. In some embodiments, the first DCI 302 comprises a different resource-time/frequency mapping method compared to that of the second DCI 304. In some other embodiments, the first DCI 302 may use a different RNTI (radio network temporary identifier) or a scrambling mask during a scrambling process compared to that used in the second DCI 304.

In some embodiments, an overhead for the indication of resource activation/deactivation/update be determined by one of the following: the total number of resources in the N resource sets, the total number of active/non-active resource in the N resource sets, the number of resource sets (i.e. N), or the number of active/non-active resource sets.

For example, referring to FIG. 6 again, when a information field of the DCI that is used for the indication of resource activation equals to a first value (e.g., 0), the first resource set 602 is an active resource set; and when the information field of the DCI that is used for the indication of resource activation equals to a second value (e.g., 1), the second resource set 604 is an active resource set.

In some embodiments, an overhead for the indication of the at least one scheduled resource information in the signaling is determined by the maximum number or a maximum index of resources or a maximum number of resource sets supported by the UE 104. In some embodiments, an overhead for the indication of the at least one scheduled resource information in the signaling is determined by the number of active resources or active resource sets. In some embodiments, when the number of active resources or active resource sets is changed, the interpretation of the scheduling resource information needs to be specified. In some embodiments, when a bitwidth of the information field is smaller than the one required for the number of active resource or resource sets indicated by the signaling, zeros can be appended or prepended to the corresponding information field. Similarly, in some other embodiments, when a bitwidth of the information field is greater than the one required for the number of active resource or resource sets indicated by the signaling, a number of most or least significant bits in the information field can be used for the interpretation of the scheduling resource information.

In some embodiments, a communication system comprises a plurality of UEs 104 (FIG. 1A) with at least one first UE 104a configured with at least one active resource, i.e., in a power saving mode, and at least one second UE 104b is not configured with active resource set, i.e., in a regular mode. In some embodiments, the BS 102 does not pair the at least one first UE 104a with the at least one second UE 104b in a Multi-User MIMO (MU-MIMO). In some embodiment, when the BS 102 pairs the at least one first UE 104a with the at least one second UE 104b in a MU-MIMO. In this case, the BS 102 selects antenna ports or reference signal ports or reference signal resources within the active resource set for the at least one first UE 104a under the power saving mode. This method can reduce scheduling time on the first UE 104a.

The method 500 continues with operation 514 in which a wireless communication is initiated according to some embodiments. In some embodiments, the wireless communication comprises the UE 104 receives PDSCH from the BS 102 or the UE 104 transmits PUSCH to the BS 102 on the at least one scheduled resource using the at least one corresponding antenna port.

Figure 7:
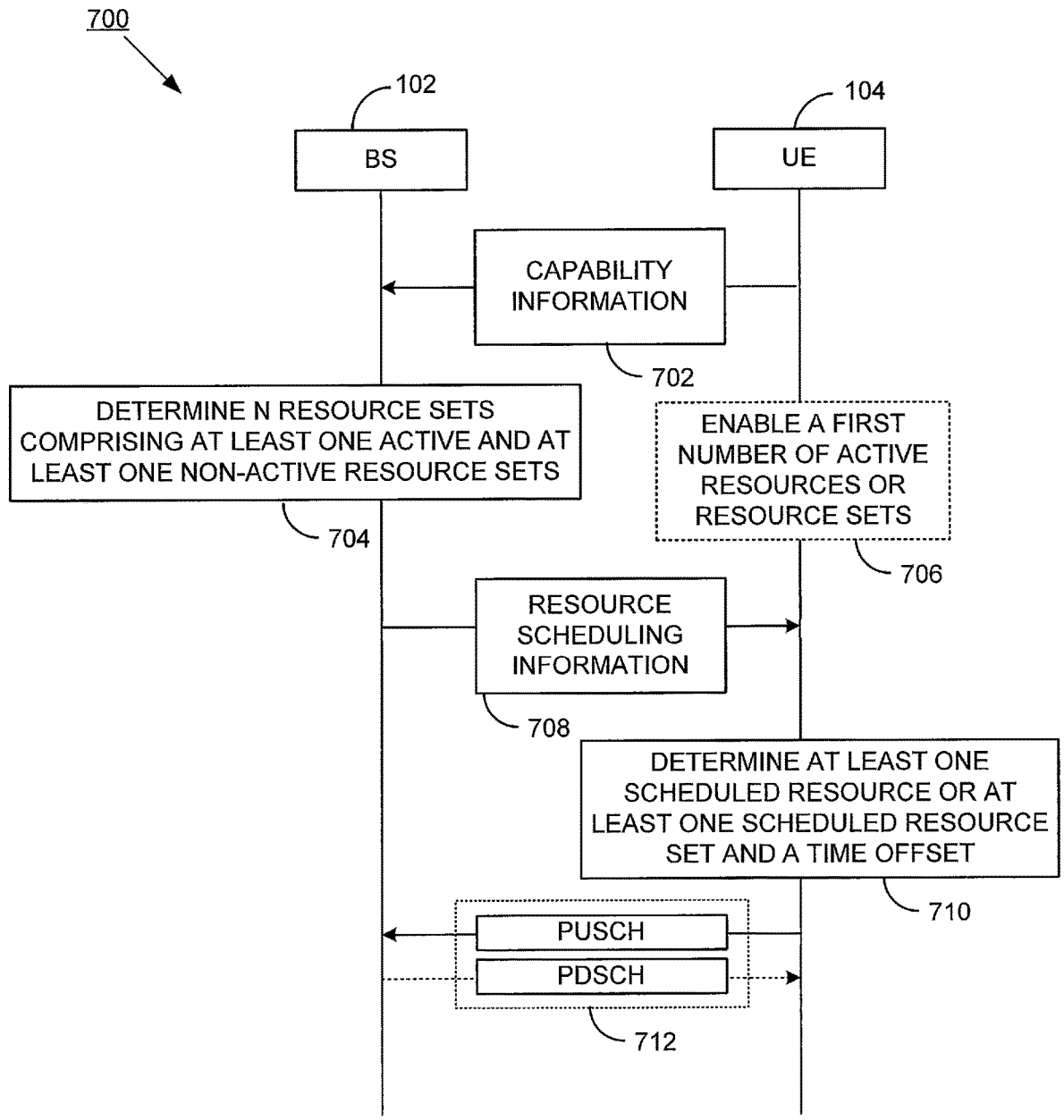
FIG. 7 illustrates a method of performing a resource indication in a wireless communication system, in accordance with some embodiments of the present disclosure.

FIG. 7 illustrates a method 700 of performing a resource port indication in a wireless communication system, in accordance with some embodiments of the present disclosure. It is understood that additional operations may be provided before, during, and after the method 700 of FIG. 7, and that some 7 operations may be omitted or reordered which are only briefly described herein. In the illustrated embodiment, there is a BS 102 and a UE 104 in a communication system. Although only 1 UE 104 is shown, any desired number of UEs 104 may be included in the system while remaining within the scope of the present disclosure.

The method 700 starts with operation 702 in which capability information of the UE 104 is transmitted to the BS 102 according to some embodiments. In some embodiments, the capability information of the UE 104 is transmitted from the UE 104 to the BS 102 on physical uplink shared channel (PUSCH). In some embodiments, the capability information of the UE 104 is transmitted from the UE 104 to the BS 102 during an initial access process, for example, when the UE 104 enters to a new cell. In some embodiments, the capability information of the UE 104 transmitted from the UE 104 to the BS 102 comprises at least one of the following: a maximum number of resources that the UE 104 can support, a maximum number of resource sets that the UE 104 can support, and a maximum number of resources in each of the resource sets. In some other embodiments, the capability information of the UE 104 can be indicated by a capability index, which can be transmitted from the UE 104 to the BS 102 on PUSCH. In some embodiments, the capability index can be used to locate the capability information according to a capability-index mapping, which can be preconfigured by the system. In some embodiments, the resource can be scheduled for wireless communications between the BS 102 and the UE 104, including PUSCH or physical downlink shared channel (PDSCH).

In some embodiments, the resource can be at least one of the following: a reference signal port, antenna port, a transmission layer, and a reference signal resource. In some embodiments, a transmission layer is a layer on which the PDSCH/PUSCH is mapped. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS). Specifically, the resource for both downlink (DL) transmission and uplink (UL) transmission can be at least one of the following: a reference signal resource, a reference signal port, and an antenna port. In some embodiments, a plurality of UE's 104 in a cell may comprise different capabilities. Specifically, the plurality of UE's 104 each may support a different maximum number of resources, a different maximum number of resource sets, and a different number or resources in each of the resource sets. In some embodiments, the capability information from the plurality of UE's 104 can be different and can be used by the BS 102 to further determine different resource sets or different numbers of resource sets for the plurality of UE's 104.

The method 700 continues with operation 704 in which N resource sets (N≥2 and N is an integer) are determined by the BS 102 according to some embodiments. In some embodiments, the N resource sets comprise at least one active resource set and at least one non-active resource set. Noted that "active resource" is a name that used to differentiate with other resources, it can be denoted by others and should not be limited by the denotation herein. In some embodiments, the BS 102 groups the plurality of resources supported by the UE 104 and forms a plurality of resource sets (i.e., N resource sets), wherein each of the plurality of resource sets comprises at least one resource. In some embodiments, the at least one resource in each of the N resource sets can be scheduled for wireless communications, including PUSCH or PDSCH. In some embodiments, the N resource sets for a UE 104 can be determined by the BS 102 according to the capability information of the corresponding UE 104.

In some embodiments, the number of resource sets (i.e., N) determined by the BS 102 is smaller than or equal to the maximum number of resource sets (i.e., L, L≥2 and L is an integer) supported by the UE 104, and the number of resources in each resource set is smaller than or equal to the maximum number of resources in each of the resource sets supported by the UE 104. For example, the capability information of the UE 104 comprises a maximum number of resources (i.e. M>0 and M is an integer) supported by the UE 104, a maximum number of resource sets (i.e. L≥2 and L is an integer) supported by the UE 104. In an example, the number of resource in one of the resource sets can be determined by N-floor(N/L)*(N−1), and the number of resource in other resource sets is floor(N/L), wherein the operation floor(.) denotes rounding down, e.g. floor(4/6)=4.

FIG. 6 illustrates an example of resource sets 600 determined by a BS 102 to a UE 104, in accordance with some embodiments of the present disclosure. In the illustrated embodiment, the UE 104 comprises and supports 8 DMRS ports, e.g., $P_i$, wherein i=0, 1, ..., 7. The BS 102 configures these 9 DMRS ports into 2 resource sets for the UE 104, i.e., a first resource set 602 and a second resource set 604. Each resource set 602/604 comprises an equal amount of resources, i.e., 4 DRMS ports. Specifically, the first resource set 602 is configured with 4 DMRS ports, i.e., $P_0, P_1, P_2$, and $P_3$ in and the second resource set 604 is configured with 4

DMRS ports, i.e., $P_4$, $P_5$, $P_6$, and $P_7$. Although only 8 resources and 2 resource sets are shown in the illustrated embodiment of FIG. 6, it should be noted that there can be any numbers of resources or resource sets and each resource set may comprise a different number of resources, which are within the scope of this present disclosure.

In some embodiments, the N resource sets grouped by the BS 102 comprises resources with continuous indices. The resources in each resource set can be determined using two of the following parameters: a maximum number of resources in a resource set, a maximum index and a minimum index of the resources in the corresponding resource set. In some embodiments, reference signal ports within a same Code Division Multiplexing (CDM) group or a same quasi co-location (QCL) group can be grouped together into a same resource set. For example, referring to FIG. 6 again, if reference signal port $P_0$, $P_1$, $P_2$, and $P_3$ are from the same QCL group, the resources $P_0$, $P_1$, $P_2$, and $P_3$ can be grouped into the same resource set (i.e., the first resource set 602). Similarly, if reference signal port $P_4$, $P_5$, $P_6$, and $P_7$ are from the same CDM group, the resources $P_4$, $P_5$, $P_6$, and $P_7$ can be grouped into the same resource set (i.e., the second resource set 604).

In some embodiments, the active resources can be indicated by the information of channel state information-reference signal (CRI-RS) resource. In the communication system, the CRI-RS resource is used for channel estimation, so the active resource, specifically, the active antenna ports can be referred from the CRI-RS resource.

In some embodiments, the active resource further comprises at least one of the following: active antenna ports, active transmission layers, active reference signal ports, active reference signal resources, active antenna port sets, active reference signal port sets, and active reference signal resource sets. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

The method 700 continues with operation 706 in which the UE 104 selects and enables a first number of active resources or active resource sets according to some embodiments. In some embodiments, the first number of the active resources is pre-defined by the system, wherein the first number of the active resources is defined as operator_1 (m×M), wherein M is the maximum number of resources supported by the UE 102 and m is a predefined value which 0≤m≤1, wherein the operator_1 comprises one of the following operators: floor (.), round (.), and ceil (.). In some embodiments, the UE 104 enables all the resources supported by the UE 104, when m=1. In some embodiments, the UE 104 disables all the resources supported by the UE 104, when m=0. In some embodiments, the first number of active resources is equal to or smaller than the maximum number of resources that are supported by the UE 104. In some embodiments, the first number of the active resource sets is pre-defined by the system, wherein the first number of the active resource sets is defined as operator_1 (n×L), wherein L is the maximum number of resource sets supported by the UE 102 and n is a predefined value which 0≤n≤1, wherein the operator_1 comprises one of the following operators: floor (.), round (.), and ceil (.). In some embodiments, the UE 104 enables all the resources supported by the UE 104, when n=1. In some embodiments, the UE 104 disables all the resources supported by the UE 104, when n=0. In some embodiments, the first number of active resource sets is equal to or smaller than the maximum number of resource sets that are supported by the UE 104. As described above, the number of potentially scheduled resources, i.e., "active resources", in this disclosure is informed to UE 104 by BS 102 in a separate step. In some embodiments, the UE 104 can enable the corresponding resources and processing units without receiving the active resource number from the BS 102. It is unnecessary for the UE 104 to enable a number of resources and processing units more than that of the active resources, which is beneficial for UE 104 in terms of lowering its power consumption before the scheduled resources are determined. In some embodiments, operation 404 can be omitted according to different applications.

The method 700 continues with operation 708 in which resource scheduling information is transmitted from the BS 102 to the UE 104 according to some embodiments. In some embodiments, the resource scheduling information is transmitted using a DCI on physical downlink control channel (PDCCH). In some other embodiments, the resource scheduling information can be transmitted on a higher layer signaling (e.g., MAC CE, RRC signaling, and SIB). In some embodiments, the resource scheduling information further comprises at least one of the following: scheduled resources, scheduled antenna ports, scheduled transmission layers, scheduled resource sets, scheduled reference signal ports, scheduled reference signal resources, scheduled resource sets, scheduled antenna port sets, scheduled reference signal port sets, and scheduled reference signal resource sets. In some embodiments, the reference signal can be at least one of the following: user equipment (UE)-specified reference signal, demodulation reference signal (DMRS), sounding reference signal (SRS), channel state information-reference signal (CSI-RS), and phase tracking-reference signal (PT-RS).

The method 700 continue with operation 710 in which a time offset between the signaling and the scheduled PDSCH/PUSCH is determined according to some embodiments. In the communication system, the interval between the scheduling information and the PDSCH/PUSCH can be determined by BS 102, a minimum value of which is specified in various embodiments of the present disclosure. In some embodiments, the minimum time offset is a minimum latency required by UE 104, for example, to respond to the DCI received from the BS 102. In some embodiments, the minimum time offset is a minimum latency indicated by the BS 102, for example, to allow the UE 104 to respond to the DCI. In some embodiments, within the minimum time offset, the UE 104 assumes no wireless communication is scheduled between the UE 104 and the BS 102, i.e., no receiving PDSCH or transmitting PUSCH.

In some embodiments, the time offset is determined by the at least one scheduled resource and the at least one active resource according to the conditions discussed in detail below. In some embodiments, the time offset is determined by the BS 102 then transmitted in the resource scheduling information to the corresponding UE 104, which can be then determined by the UE 104 by decoding the resource scheduling information. In some other embodiments, the time offset is determined directly by the UE 104 after decoding the resource scheduling information and obtaining the at least one scheduled resource. The UE further continues to determine the time offset by comparing the at least one scheduled resource and the at least one active resource.

In some embodiments, when the at least one scheduled resource is a subset of the at least one active resource set, a minimum time offset K1 is required before proceeding to the wireless communications, e.g., transmitting PUSCH to the BS 102 or receiving PDSCH from the BS 102. In some embodiments, when the at least one scheduled reference signal port is a subset of the at least one active reference signal port set, the minimum time offset K1 is required before proceeding to the wireless communications, e.g., transmitting PUSCH to the BS 102 or receiving PDSCH from the BS 102. In some embodiments, when the at least one scheduled antenna port is a subset of the at least active antenna port set, the minimum time offset K is required before proceeding to the wireless communications, e.g., transmitting PUSCH to the BS 102 or receiving PDSCH from the BS 102. In some embodiments, when the at least one scheduled reference signal resource is a subset of the at least one active reference signal resource set, the minimum time offset K1 is required before proceeding to the wireless communications, e.g., transmitting PUSCH to the BS 102 or receiving PDSCH from the BS 102.

In some embodiments, when at least one of the at least one scheduled resource is not included in the at least one active resource set, a minimum time offset K2 is required before proceeding to the wireless communications, e.g., transmitting PUSCH to the BS 102 or receiving PDSCH from the BS 102. In some embodiments, when at least one of the at least, one scheduled reference signal port is not included in the at least one active reference signal port set, the minimum time offset K2 is required before proceeding to the wireless communications, e.g., transmitting PUSCH to the BS 102 or receiving PDSCH from the BS 102. In some embodiments, when at least one of the at least one scheduled antenna port is not included in the at least one active antenna port set the minimum time offset K2 is required before proceeding to the wireless communications, e.g., transmitting PUSCH to the BS 102 or receiving PDSCH from the BS 102. In some embodiments, when at least one of the at least one scheduled reference signal resource is not included in the at least one active reference signal resource set, the minimum time offset K2 is required before proceeding to the wireless communications, e.g., transmitting PUSCH to the BS 102 or receiving PDSCH from the BS 102.

In some embodiments, the time offset (including K1 and K2) is defined between the first OFDM symbol of the signaling (e.g. the DCI or a higher layer signaling) with the resource scheduling information and the first OFDM symbol of the PUSCH or PDSCH scheduled by the signaling. In some embodiments, the time offset (including K1 and K2) is defined between the reception of the signaling (e.g. the DCI or a higher layer signaling) with the resource scheduling information and the first OFDM symbol of the PUSCH or PDSCH scheduled by the signaling. In some embodiments, the minimum time offset can be configured by the higher layer parameter (e.g. MAC CE, RRC signaling, and SIB). In some embodiments, the minimum time offset (i.e., K1 and K2) can be indicated through the DCI as a part of the resource scheduling information. In some embodiments, the minimum time offset (i.e., K1 and K2) can be a pre-determined value. The minimum time offset is required so as to allow enough time for the UE 104 to enable resources and associated processing units corresponding to the at least one scheduled resource for the wireless communications. In some embodiments, the minimum time offset K1 is smaller than the minimum time offset K2. In some embodiments, the minimum time offset K1 can be zero.

In some embodiments, values of K1 and K2 are determined by the capability of the UE 104. For example, for different UE's 104 with different capability, a set of time offset values, {ki}, is pre-defined by the system, wherein $1 \le i \le C$ and C is a positive integer. In some embodiments, rules for selecting time offsets under different situations can be also pre-defined by the system. In some embodiments, when the BS 102 determines scheduled resources or when the UE 104 receives the scheduled resources, a time offset value can be determined. For another example, a pre-defined set of time offset values, {ki}, is configured by the system, wherein $1 \le i \le C$ and C is a positive integer. In some embodiments, the BS 102 selects a largest time offset value from the pre-defined set of time offset values, to allow different resource scheduling for different UE's 104.

In some embodiments, when the scheduled resources or resource sets by the BS 102 is different from the active ones, or the number of the active resource or active resource sets by the DCI is changed, an increased minimum time offset is required so as to allow the UE 104 to respond to the scheduling signaling, i.e., K2 is larger than K1. With the increased minimum time offset, the scheduling flexibility is unimpaired and at the same time UE 104 does not need to enable too many resources and the corresponding processing units thus the power assumption is remained low.

In some embodiments, the at least one scheduled resource can only be a subset of the at least one active resource set of the N resource sets configured by the BS 102 for the corresponding UE 104. In this case, in order to activate the at least one scheduled resource, a separate activation operation is required, which can be performed by a higher layer signaling (e.g., MAC CE, RRC signaling, SIB) or a different DCI signaling/information field for activation. Once the at least one scheduled resource that are previously non-active is activated by the separate activation process, the active scheduled resource can then be used for PUSCH/PDSCH transmission. In some embodiments, if the at least one active resource set is updated (e.g. activated or de-activated) by a higher-layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, if at least one active resource set is activated by higher layer parameter (e.g. MAC CE, RRC signaling, and SIB) or DCI is larger than the previous one, a minimum time offset is required before proceeding to the wireless communications, e.g., transmitting PUSCH to the BS 102 or receiving PDSCH from the BS 102.

In some other embodiments, the at least one scheduled resource comprises at least one resource in a non-active resource set. In some embodiments, the at least one active resource set can be updated according to the at least one resource scheduled by the signaling. In some embodiments, when the resources scheduling information is received or the resources scheduling information is successfully decoded or when one of the following is received by the BS 102 or transmitted by the UE 104, including an acknowledgement, a negative acknowledgement, and PUSCH, the active resource set can be updated according to the scheduled resources by the signaling. In some embodiments, when the at least one active resource set is updated by a higher-layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102. In some embodiments, when at least one active resource is activated by higher layer parameter (e.g. MAC CE, RRC signaling, and SIB) or the DCI, a minimum time offset is required before proceeding to the wireless communications, e.g., transmitting PUSCH to the BS 102 or receiving PDSCH from the BS 102.

In some embodiments, when the at least one active resource set in the N resource sets is updated, for example, the BS 102 activates new resources, deactivates previously active resources, etc., the updated information of a new N resource set or the indication of activation/deactivation is transmitted through the higher layer signaling or the DCI from the BS 102 to the UE 104.

In some embodiments, a DCI comprises a information field for indicating at least one resource set as an active resource set or a non-activation resource set, i.e., an indication of resource activation/deactivation. In some other embodiments, an information field in the DCI can be also used to indicate the non-active resource sets, wherein the size of the information field in the DCI is determined by the total number of resource sets (i.e. N) or the total number of active resource sets.

In some other embodiments, the activation or deactivation of a resource or a resource set can be indicated by a higher-layer parameter. For example, the higher layer parameter comprises one of the following: radio resource control (RRC) signaling, medium access control (MAC) control element (CE), and system information block (SIB).

In some other embodiments, activation of a resource or a resource set can be determined by a timer. In some embodiments, a default resource or resource set can be configured (e.g., by a higher-layer parameter or the DCI). In some embodiments, a timer can be triggered by some conditions, for example, when a UE 104 detects a DCI signaling with a grant. After the timer terminates, the default resource set can be activated and the resources in the default resource set can be then used as scheduled resources for the wireless communications.

In some embodiments, a same signaling but different information fields are used to activate/deactivate resource or resource set. In some embodiments, different signaling can be used to activate/deactivate resource or resource set.

In some embodiments, the active resources or active resource sets is indicated by the channel state information-reference signal (CRI-RS) resource. In some embodiments, the CRI-RS resource is determined by the transmission configuration indicator (TCI) carried in DCI.

In some embodiments, an overhead for the indication of the information of the at least one scheduled resource in the signaling is determined by the maximum number of or a maximum index of or a maximum number of resource sets supported by the UE 104. In some embodiments, an overhead for the indication of information of the at least one scheduled resource information in the signaling is determined by the number of active resources or active resource sets. In some embodiments, when the number of active resources or active resource sets is changed, the interpretation of the scheduling resource information needs to be specified. In some embodiments, when a bitwidth of the information field is smaller than the one required for the number of active resources or resource sets indicated by the signaling, zeros can be appended or prepended to the corresponding information field in the signaling. Similarly, in some other embodiments, when a bitwidth of the information field is greater than the one required for the number of active resources or resource sets indicated by the signaling, a number of most or least significant bits in the information field can be used for the interpretation of the resource scheduling information.

The method 700 continues with operation 712 in which a wireless communication is initiated according to some embodiments. In some embodiments, the wireless communications comprises the UE 104 receiving PDSCH from the BS 102 or the UE 104 transmitting PUSCH to the BS 102 on the at least one scheduled resource using the at least one corresponding antenna.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the some illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, comprising:
transmitting a first message to a wireless communication device, and
after a time offset, performing wireless communications scheduled by the first message with the wireless communication device,
wherein a minimum value of the time offset is K1 when a first condition is satisfied and wherein the minimum value of the time offset is K2 when a second condition is satisfied, wherein K1 and K2 are non-equal, non-negative values,
wherein the first condition comprises at least one of:
a number of at least one reference signal port scheduled in the first message is equal to or smaller than a number of at least one active reference signal port;
a number of reference signal port sets scheduled in the first message is equal to or smaller than a number of active reference signal port sets;
a number of at least one antenna port scheduled in the first message is equal to or smaller than a number of active antenna ports,
a number of antenna port sets scheduled in the first message is equal to or smaller than a number of active antenna port sets,
at least one reference signal port scheduled in the first message is a subset of at least one active reference signal port set; and
at least one antenna port scheduled in the first message is a subset of at least one active antenna port, and
wherein the second condition comprises at least one of:
a number of at least one reference signal port scheduled in the first message is greater than a number of at least one active reference signal port;
a number of reference signal port sets scheduled in the first message is greater than a number of active reference signal port sets;
a number of antenna ports scheduled in the first message is greater than a number of active antenna ports;
a number of antenna port sets scheduled in the first message is greater than a number of active antenna port sets;
at least one of the at least one reference signal port scheduled in the first message is not a subset of the at least one active reference signal port set and
at least one of the at least one antenna port scheduled in the first message is not a subset of at least one active antenna port set.

2. The method of claim 1, wherein the first message is transmitted on one of the following: downlink control information (DCI) and a higher layer signaling.

3. The method of claim 1, wherein the first message comprises at least one of the following: information of at least one active resource, at least one active resource set, at least one resource scheduled for the wireless communication, and transmission configuration indication (TCI).

4. The method of claim 3, wherein the information of at least one active resource comprises at least one of the following: a number of the at least one active resource, a number of that at least one active resource set, and at least one resource in the at least one active resource set.

5. The method of claim 4, wherein the at least one active resource comprises one of the following: the at least one resource scheduled in the first message, the at least one resource activated in the first message, the at least one resource indicated by a channel state information-reference signal (CRI-RS) resource.

6. The method of claim 3, wherein the resource comprises at least one of the following: a reference signal resource, a reference signal port, an antenna port, wherein the reference signal comprises at least one of the following: user-equipment (UE) specific reference signal, demodulation reference signal (DMRS), sounding reference signal (SRS), channel state information-reference signal (CSI-RS), and phase tracking-reference signal (PT-RS).

7. The method of claim 1, wherein the first condition further comprises at least one of the following:
   a number of at least one resource scheduled in the first message is equal to or smaller than a number of the at least one active resource;
   a number of transmission layers scheduled in the first message is equal to or smaller than a number of active transmission layers;
   a number of resource sets scheduled in the first message is equal to or smaller than the number of the active resource sets; and
   at least one resource scheduled in the first message is a subset of the at least one active resource set.

8. The method of claim 1, wherein the second condition further comprises at least one of the following:
   a number of at least one resource scheduled in the first message is greater than a number of the at least one active resource;
   a number of transmission layers scheduled in the first message is greater than a number of active layers;
   a number of resource sets scheduled in the first message is greater than a number of the at least one active resource set;
   at least one of the at least one resource scheduled in the first message is not a subset of the at least one active resource set;
   and
   information of active resources is updated by the first message.

9. The method of claim 1, wherein the minimum time offset K1 and K2 is determined by one of the following:
   configured by a higher layer parameter;
   indicated by the DCI; and
   a capability of the wireless communication.

10. The method of claim 1, wherein K1 is smaller than K2.

11. The method of claim 1, further comprising:
   prior to the transmitting, receiving a second message from the wireless communication device, wherein the second message comprises at least one of the following: a maximum number of resources supported by the wireless communication device, a maximum number of resource sets supported by the wireless communication device, a maximum number of resources in each of the resource sets, supported by the wireless communication device; and
   determining the first message according to the second message.

12. The method of claim 1, wherein the wireless communications comprise one of the following: receiving a physical uplink shared channel (PUSCH) from the wireless communication device and transmitting a physical downlink shared channel (PDSCH) to the wireless communication device according to the at least one resource scheduled related to the first message.

13. A method performed by a wireless communication device, comprising:
   receiving a first message from a wireless communication node, and
   after a time offset, performing wireless communications scheduled by the first message with the wireless communication node,
   wherein a minimum value of the time offset is K1 when a first condition is satisfied and wherein the minimum value of the time offset is K2 when a second condition is satisfied, wherein K1 and K2 are non-equal, non-negative values,
   wherein the first condition comprises at least one of:
      a number of at least one reference signal port scheduled in the first message is equal to or smaller than a number of at least one active reference signal port;
      a number of reference signal port sets scheduled in the first message is equal to or smaller than a number of active reference signal port sets;
      a number of at least one antenna port scheduled in the first message is equal to or smaller than a number of active antenna ports,
      a number of antenna port sets scheduled in the first message is equal to or smaller than a number of active antenna port sets,
      at least one reference signal port scheduled in the first message is a subset of at least one active reference signal port set; and
      at least one antenna port scheduled in the first message is a subset of at least one active antenna port, and
   wherein the second condition comprises at least one of:
      a number of at least one reference signal port scheduled in the first message is greater than a number of at least one active reference signal port;
      a number of reference signal port sets scheduled in the first message is greater than a number of active reference signal port sets;
      a number of antenna ports scheduled in the first message is greater than a number of active antenna ports;
      a number of antenna port sets scheduled in the first message is greater than a number of active antenna port sets;
      at least one of the at least one reference signal port scheduled in the first message is not a subset of the at least one active reference signal port set; and
      at least one of the at least one antenna port scheduled in the first message is not a subset of the at least one active antenna port set.

14. The method of claim 13, wherein the first message is transmitted on one of the following: downlink control information (DCI) and a higher layer signaling.

15. The method of claim 13, wherein the first message comprises at least one of the following: information of at least one active resource, at least one active resource set, at least one resource scheduled for the wireless communication, and transmission configuration indication (TCI).

16. The method of claim 15, wherein the information of at least one active resource comprises at least one of the following: a number of the at least one active resource, a number of the at least one active resource set, and at least one resource in the at least one active resource set.

17. The method of claim 16, wherein the at least one active resource comprises one of the following: the at least one resource scheduled in the first message, the at least one first resource activated in the first message, and at least one resource indicated by a channel state information—reference signal (CRI-RS) resource.

18. The method of claim 15, wherein the resource comprises at least one of the following: a reference signal resource, a reference signal port, an antenna port, wherein the reference signal comprises at least one of the following: user-equipment (UE) specific reference signal, demodulation reference signal (DMRS), sounding reference signal (SRS), channel state information-reference signal (CSI-RS), and phase tracking-reference signal (PT-RS).

19. The method of claim 13, wherein the first condition further comprises at least one of the following:
a number of at least one resource scheduled in the first message is equal to or smaller than the number of the at least one active resource;
a number of transmission layers scheduled in the first message is equal to or smaller than a number of active transmission layers;
a number of resource sets scheduled in the first message is equal to or smaller than a number of active resource sets; and
the at least one resource scheduled in the first message is a subset of the at least one active resource set.

20. The method of claim 13, wherein the second condition further comprises at least one of the following:
a number of at least one resource scheduled in the first message is greater than a number of at least one active resource;
a number of transmission layers scheduled in the first message is greater than a number of active layers;
at least one of the at least one resource scheduled in the first message is not a subset of the at least one active resource set; and
the information of active resources is updated by the first message.

21. The method of claim 13, wherein the minimum time offset K1 and K2 is determined by one of the following:
configured by a higher layer parameter;
indicated by the DCI; and
a capability of the wireless communication device.

22. The method of claim 13, wherein K1 is equal to or smaller than K2.

23. The method of claim 13, further comprising:
prior to the receiving, transmitting a second message from the wireless communication device, wherein the second message comprises one of the following: a maximum number of resources supported by the wireless communication device, a maximum number of resource sets supported by the wireless communication device, a maximum number of resources in each of the resource sets, supported by the wireless communication device, and wherein the second message is used by the wireless communication node to determine the first message.

24. The method of claim 13, wherein the wireless communications comprise one of the following: receiving a physical uplink shared channel (PUSCH) from the wireless communication device and transmitting a physical downlink shared channel (PDSCH) to the wireless communication device according to the at least one resource scheduled in the first message.

25. A wireless communication node, comprising:
a transmitter configured to transmit a first message to a wireless communication device; and
at least one processor configured to, after a time offset, perform wireless communications scheduled by the first message with the wireless communication device,
wherein the first message is transmitted on one of the following: downlink control information (DCI) and a higher layer signaling, and
wherein a minimum value of the time offset is K1 when a first condition is satisfied and wherein the minimum value of the time offset is K2 when a second condition is satisfied,
wherein K1 and K2 are non-equal, non-negative values,
wherein the first condition comprises at least one of:
a number of at least one reference signal port scheduled in the first message is equal to or smaller than a number of at least one active reference signal port;
a number of reference signal port sets scheduled in the first message is equal to or smaller than a number of active reference signal port sets;
a number of at least one antenna port scheduled in the first message is equal to or smaller than a number of active antenna ports,
a number of antenna port sets scheduled in the first message is equal to or smaller than a number of active antenna port sets,
at least one reference signal port scheduled in the first message is a subset of the at least one active reference signal port set; and
at least one antenna port scheduled in the first message is a subset of the at least one active of active antenna ports, and
wherein the second condition comprises at least one of:
a number of at least one reference signal port scheduled in the first message is greater than a number of at least one active reference signal port;
a number of reference signal port sets scheduled in the first message is greater than a number of active reference signal port sets;
a number of antenna ports scheduled in the first message is greater than a number of active antenna ports;
a number of antenna port sets scheduled in the first message is greater than a number of active antenna port sets;
at least one of the at least one reference signal port scheduled in the first message is not a subset of the at least one active reference signal port set; and
at least one of the at least one antenna port scheduled in the first message is not a subset of the at least one active of active antenna port set.

26. A wireless communication device, comprising:
a receiver configured to receive a first message from a wireless communication node; and
at least one processor configured to, after a time offset, perform wireless communications scheduled by the first message with the wireless communication node,
wherein the first message is transmitted on one of the following: downlink control information (DCI) and a higher layer signaling, and
wherein a minimum value of the time offset is K1 when a first condition is satisfied and wherein the minimum value of the time offset is K2 when a second condition is satisfied,
wherein K1 and K2 are non-equal, non-negative values,
wherein the first condition comprises at least one of:
a number of at least one reference signal port scheduled in the first message is equal to or smaller than a number of at least one active reference signal port;
a number of reference signal port sets scheduled in the first message is equal to or smaller than a number of active reference signal port sets;
a number of at least one antenna port scheduled in the first message is equal to or smaller than a number of active antenna ports,
a number of antenna port sets scheduled in the first message is equal to or smaller than a number of active antenna port sets, at least one reference signal port scheduled in the first message is a subset of the at least one active reference signal port set; and at least one antenna port scheduled in the first message is a subset of the at least one active of active antenna ports, and wherein the second condition comprises at least one of:

a number of at least one reference signal port scheduled in the first message is greater than a number of at least one active reference signal port;

a number of reference signal port sets scheduled in the first message is greater than a number of active reference signal port sets;

a number of antenna ports scheduled in the first message is greater than a number of active antenna ports;

a number of antenna port sets scheduled in the first message is greater than a number of active antenna port sets;

at least one of the at least one reference signal port scheduled in the first message is not a subset of the at least one active reference signal port set; and at least one of the at least one antenna port scheduled in the first message is not a subset of the at least one active of active antenna port set.

* * * * *